United States Patent
Kozlov et al.

(10) Patent No.: US 10,628,493 B2
(45) Date of Patent: Apr. 21, 2020

(54) METHOD AND SYSTEM FOR GENERATING SEARCH QUERY SUGGESTIONS

(71) Applicant: YANDEX EUROPE AG, Lucerne (CH)

(72) Inventors: Dmitry Vladimirovich Kozlov, Moscow (RU); Igor Evgenyevich Kuralenok, Saint-Petersburg (RU); Maksim Andreevich Balyan, Moscow (RU)

(73) Assignee: Yandex Europe AG, Lucerne (CH)

( * ) Notice: Subject to any disclaimer, the term of this patent is extended or adjusted under 35 U.S.C. 154(b) by 492 days.

(21) Appl. No.: 15/262,378

(22) Filed: Sep. 12, 2016

(65) Prior Publication Data
US 2017/0091211 A1    Mar. 30, 2017

(30) Foreign Application Priority Data

Sep. 24, 2015 (RU) ................................ 2015140744

(51) Int. Cl.
*G06F 16/9032* (2019.01)
*G06F 16/9535* (2019.01)

(52) U.S. Cl.
CPC .... *G06F 16/90324* (2019.01); *G06F 16/9535* (2019.01)

(58) Field of Classification Search
CPC ....................... G06F 17/3097; G06F 17/30867
See application file for complete search history.

(56) References Cited

U.S. PATENT DOCUMENTS

| 7,100,123 B1 | 8/2006 | Todd et al. |
| 8,275,759 B2 | 9/2012 | Imig et al. |
| 8,275,786 B1 | 9/2012 | Dave et al. |
| 8,577,913 B1 | 11/2013 | Hansson et al. |
| 8,595,252 B2 | 11/2013 | Wu et al. |
| 8,601,019 B1 | 12/2013 | Weininger et al. |
| 8,700,653 B2 | 4/2014 | Hansson et al. |
| 8,706,750 B2 | 4/2014 | Hansson et al. |

(Continued)

OTHER PUBLICATIONS

Russian Search Report dated Oct. 10, 2016 from Russian Patent application No. 2015140744.

*Primary Examiner* — Belix M Ortiz Ditren
*Assistant Examiner* — Dustin D Eyers
(74) *Attorney, Agent, or Firm* — BCF LLP

(57) ABSTRACT

A method of generating search query suggestions for a search query received in a search application. The method is executable by a processor communicatively coupled to the search application. The method includes receiving a search query and an indication of a current cursor position with respect thereto. The search query is a received search query and includes at least one received search query term. Responsive to the current cursor position being one of a plurality of predefined cursor positions, one of a plurality of suggest algorithms corresponding to one of a plurality of predefined suggest actions associated with the current cursor position is executed to define a suggested search query. Each one of the plurality of predefined cursor positions has associated therewith at least one of the plurality of predefined suggest actions. Each one of the plurality of predefined suggest actions corresponds to one of the plurality of suggest algorithms.

15 Claims, 13 Drawing Sheets

(56) References Cited

U.S. PATENT DOCUMENTS

| | | | |
|---|---|---|---|
| 2012/0179705 A1* | 7/2012 | Kumaran | G06F 17/30646 707/767 |
| 2014/0280109 A1 | 9/2014 | Zomet et al. | |
| 2014/0280290 A1 | 9/2014 | Baumgartner | |
| 2015/0046800 A1* | 2/2015 | Isidore | G06F 17/24 715/255 |

* cited by examiner

METHOD AND SYSTEM FOR GENERATING SEARCH QUERY SUGGESTIONS

CROSS-REFERENCE

The present application claims priority to Russian Patent Application No. 2015140744, filed Sep. 24, 2015, entitled "METHOD AND SYSTEM FOR GENERATING SEARCH QUERY SUGGESTIONS", the entirety of which is incorporated herein by reference.

FIELD

The present technology relates to presentation of search query suggestions in a browser window.

BACKGROUND

A browser application such as Mozilla Firefox™, Google Chrome™, Yandex™, and the like can be used to access information via various kinds of global or local communication networks (the Internet, the World Wide Web, local area networks and the like). The available information includes a variety of content types, such as photos, video, audio and the like, and relates to a wide range of topics, such as but not limited to news, weather, traffic, entertainment, finance and the like. The information is accessed using a wide range of electronic devices such as desktop computers, laptop computers, smartphones, tablets and the like.

Users can access a particular resource directly, either by typing an address of the resource (typically an URL or Universal Resource Locator, such as www.webpage.com) or by clicking a link in an e-mail or in another web resource. Browser applications typically have a search function that allows the user to locate web resources for which they do not have the address or a link. When performing searches, the user typically wants to locate the most relevant results and desires to obtain those results relatively quickly. Sometimes, however, the user may not know exactly what search query will provide the information he or she wants, and may thus need to enter many trials search queries in order to obtain the desired search results. To at least partially address these concerns, browser applications typically also have a query suggestion function that provides the user with query suggestions. For example, in response to a user typing a query "Molly" into the Google™ search engine, the user gets a list of suggestions in a drop down menu, namely "Molly Ringwald", "Molly Maid", etc. The general idea behind the suggestions is to enable a more user-friendly search experience and to assist the user in more efficiently exploring a subject of interest. Search query suggestions can thus be useful in guiding the user in performing their search.

SUMMARY

It is an object of the present technology to ameliorate at least some of the inconveniences present in the prior art.

Implementations of the present technology have been developed based on inventors' appreciating that there exists at least one problem or an area for improvement associated with the prior art solutions.

As such, according to a first broad aspect of the present technology, there is provided a method of generating search query suggestions for a search query received from a user in a search application. The method is executable by a processor that is communicatively coupled to the search application. The method includes receiving a search query, the search query being a received search query and including at least one received search query term. An indication of a current cursor position with respect to the received search query is received. Responsive to the current cursor position being one of a plurality of predefined cursor positions, one of a plurality of suggest algorithms corresponding to one of a plurality of predefined suggest actions associated with the current cursor position is executed to define a suggested search query. Each one of the plurality of predefined cursor positions has associated therewith at least one of the plurality of predefined suggest actions. Each one of the plurality of predefined suggest actions corresponds to one of the plurality of suggest algorithms.

In some implementations, the plurality of predefined suggest actions includes an inserting suggest action for inserting a suggested search query term in the received search query. The inserting suggest action is associated with an insertion suggest algorithm. A deleting suggest action for deleting a cursor indicative search term in the received search query is associated with a deletion suggest algorithm. A replacing suggest action for replacing the cursor indicative search term in the received search query is associated with a replacement suggest algorithm.

In some implementations, the plurality of predefined cursor positions includes a search query beginning cursor position, a search query ending cursor position, a search term beginning cursor position, a search term ending cursor position, and a search term interior cursor position.

In some implementations, the plurality of predefined suggest actions includes an inserting suggest action for inserting a suggest word in the received search query. The inserting suggest action is associated with an insertion suggest algorithm. A deleting suggest action for deleting a cursor indicative search term of the at least one received search query term in the received search query is associated with a deletion suggest algorithm. A replacing suggest action for replacing the cursor indicative search term is associated with a replacement suggest algorithm. The search query beginning cursor position is associated with the inserting suggest action. The search query ending cursor position is associated with the inserting suggest action and the deleting suggest action. The search term beginning cursor position is associated with the inserting suggest action. The search term ending cursor position is associated with the replacing suggest action and the deleting suggest action. The search term interior cursor position is associated with the replacing suggest action and the deleting suggest action.

In some implementations, the insertion suggest algorithm corresponding to the inserting suggest action and the deletion suggest algorithm corresponding to the deleting suggest action are both executed responsive to the current cursor position being the search query ending cursor position.

In some implementations, the replacement suggest algorithm corresponding to the replacing suggest action and the deletion suggest algorithm corresponding to the deleting suggest action are both executed responsive to the current cursor position being the search term ending cursor position.

In some implementations, the replacement suggest algorithm corresponding to the replacing suggest action and the deletion suggest algorithm corresponding to the deleting suggest action are both executed responsive to the current cursor position being the search term interior cursor position.

In some implementations, executing the insertion suggest algorithm includes selecting the suggested search query from a plurality of previous search queries. Each of the plurality of previous search queries includes all of the at least one received search query term of the received search query and at least one search term in addition to each of the at least one received search query term.

In some implementations, executing the replacement suggest algorithm includes defining the cursor indicative search term in the received search query, a received search query first portion preceding the cursor indicative search term in the received search query, and a received search query second portion following the cursor indicative search term in the received search query. The suggested search query is selected from a plurality of previous search queries. Each of the plurality of previous search queries includes the received search query first portion, the received search query second portion occurring after the received search query first portion, and at least one search term other than the cursor indicative search term between the received search query first portion and the received search query second portion.

In some implementations, executing the deletion suggest algorithm includes defining the cursor indicative search term in the received search query, a received search query first portion preceding the cursor indicative search term in the received search query, and a received search query second portion following the cursor indicative search term in the received search query. The cursor indicative search term is deleted in the received search query to define the suggested search query responsive to at least one of a plurality of previous search queries having the received search query first portion followed immediately by the received search query second portion without the cursor indicative search term appearing between the received search query first portion and the received search query second portion.

In some implementations, the suggested search query is defined using previous search queries.

In some implementations, defining the suggested search query comprises defining a plurality of suggested search queries by executing the one of the plurality of suggest algorithms corresponding to the one of the plurality of predefined suggest actions associated with the current cursor position.

In some implementations, at least one of the plurality of predefined cursor positions has associated therewith a plurality of the plurality of predefined suggest actions.

In some implementations, each one of the plurality of suggest algorithms corresponding to each one of the plurality of predefined suggest actions associated with the current cursor position is executed responsive to the current cursor position being one of a plurality of predefined cursor positions.

In some implementations, the one of the plurality of predefined suggest actions associated with the current cursor position is a first suggest action associated with the current cursor position. The one of the plurality of suggest algorithms is a first suggest algorithm corresponding to the first suggest action. The suggested search query is a first suggested search query defined using the first suggest algorithm corresponding to the first suggest action. The current cursor position has associated therewith a second suggest action of the plurality of predefined suggest actions, a second suggest algorithm corresponding to the second suggest action. The method further includes defining a second suggested search query by executing the second suggest algorithm corresponding to the second suggest action associated with the current cursor position.

In some implementations, the suggested search query is presented as a user selectable element in a search application window of the search application, the search application window including the received search query.

In some implementations, a representation of the suggested search query is presented as a user selectable element in a search application window of the search application, the search application window including the received search query.

In some implementations, the representation of the suggested search query includes one of: an entirety of the suggested search query, a portion of the suggested search query, and a deletion of a portion of the received search query.

According to a second broad aspect of the present technology, there is provided a server including a processor and a network communication interface operatively coupled to the processor for communicating, via a communication network, with an electronic device executing a search application. The processor is configured to receive a search query from the electronic device, the search query being a received search query and including at least one received search query term. An indication of a current cursor position with respect to the received search query is received from the electronic device. Responsive to the current cursor position being one of a plurality of predefined cursor positions, one of a plurality of suggest algorithms corresponding to one of a plurality of predefined suggest actions associated with the current cursor position is executed to define a suggested search query. Each one of the plurality of predefined cursor positions has associated therewith at least one of the plurality of predefined suggest actions. Each one of the plurality of predefined suggest actions corresponds to one of the plurality of suggest algorithms.

In some implementations, the server is further configured to provide the defined suggested search query to the electronic device for presentation to a user of the electronic device.

According to a second broad aspect of the present technology, there is provided an electronic device including a processor, a user output device operatively coupled to the processor and adapted to display a search application window, and a user input device operatively coupled to the processor and adapted to allow a user to enter a search query in the search application window. A pointing device is operatively coupled to the user output device and the processor. The pointing device is adapted to allow the user to position a cursor in the search query in the search application window. A network communication interface is operatively coupled to the processor and adapted for communicating with a server via a communication network. The processor is configured to receive the search query, the search query being a received search query and including at least one received search query term. An indication of a current cursor position with respect to the received search query is received. Responsive to the current cursor position being one of a plurality of predefined cursor positions, one of a plurality of suggest algorithms corresponding to one of a plurality of predefined suggest actions associated with the current cursor position is executed to define a suggested search query. Each one of the plurality of predefined cursor positions has associated therewith at least one of the plurality of predefined suggest actions. Each one of the plurality of predefined suggest actions corresponds to one of the plurality of suggest algorithms. A representation of the defined suggested search query is presented in the search application window on the user output device.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, a "web resource" is any data or collection of data that can be provided by a publisher over a network and that is associated with a web resource address. Non-limiting examples of web resources include HTML pages, documents, images, video, feed sources, as well as pluralities of files such as the foregoing. Web resources may include content, such as words, phrases, pictures, and so on, and/or embedded information such as metadata, hyperlinks and/or embedded instructions (such as JavaScript scripts).

In the context of the present specification, "client device" or "electronic device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
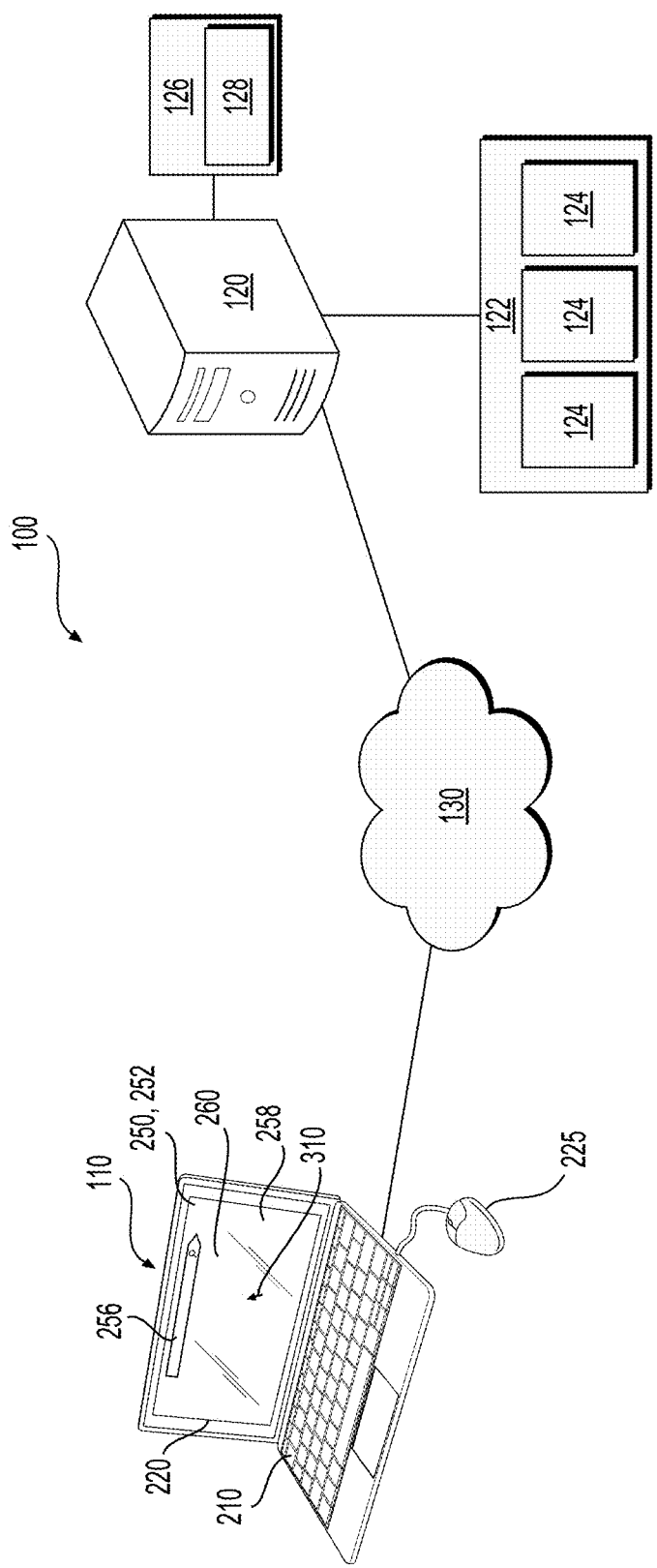
FIG. 1 is a schematic illustration of a system in accordance with a non-limiting implementation of the present technology.

With reference to FIG. 1, there is shown a schematic diagram of a system 100 suitable for use with some implementations of the present technology. It should be understood that the system 100 is shown herein merely as an illustrative implementation of the present technology. Thus, the description of the system 100 that follows is intended to be only a description of illustrative examples of the present technology. This description is not intended to define the scope or set forth the bounds of the present technology.

In some cases, what are believed to be helpful examples of modifications to the system 100 may also be set forth below. The modifications are described merely as an aid to understanding, and again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to receive search queries and to conduct web searches (e.g., general searches, vertical searches) in response thereto, as well as to process search queries in accordance with non-limiting implementations of the present technology. As such, any system variation configured to process user search queries can be adapted to execute implementations of the present technology, once teachings presented herein are appreciated.

The system 100 includes an electronic device 110, a server 120 and a communication network 130. The electronic device 110 communicates with the server 120 via the communication network 130. Although the present description is made with reference to the system 100 having one electronic device 110 and one server 120, it should be understood that the system 100 could include more than one electronic device 110 and more than one server 120.

The electronic device 110 is typically associated with a user (not depicted) and, as such, is sometimes referred to as a "client device". In the illustrated implementation, the electronic device 110 is a laptop computer. The implementation of the electronic device 110 is however not limited to a laptop computer 110. As an example, the electronic device 110 may be implemented as smartphone, a personal computer (desktops, laptops, netbooks, etc.), a wireless electronic device (a cell phone, a smartphone, a tablet and the like), as well as network equipment (a router, a switch, or a gateway). The general implementation of the electronic device 110 is known in the art and, as such, will not be described here at much length.

Figure 2:
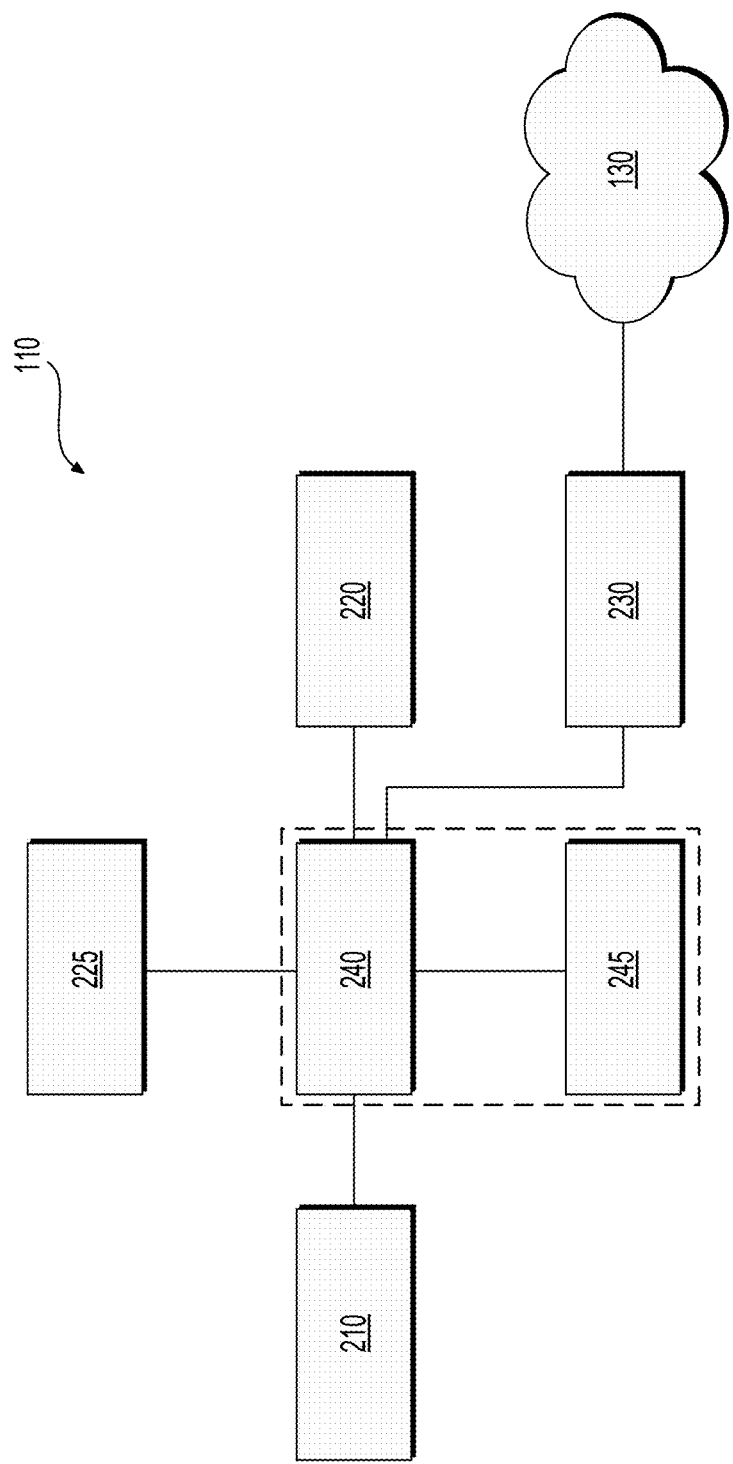
FIG. 2 is a schematic block diagram of an electronic device of the system of FIG. 1 in accordance with a non-limiting implementation of the present technology.

With reference to FIG. 2, the electronic device 110 includes a user input device 210 (such as a keyboard, a mouse, a touch pad, a touch screen, microphone, and the like) for receiving user inputs. The electronic device 110 includes a user output device 220 in the form of a display screen. The electronic device 110 also includes other forms of user output devices 220 such as a speaker, a printer and the like for providing other types of visual, auditory or tactile outputs to the user but these other forms of user output devices 220 will not be discussed herein. For simplicity, the user output device 220 will be referred to herein as screen 220. The electronic device 110 includes a pointing device 225 for positioning a cursor 310 (FIG. 3) on a display screen. As will be readily understood by a skilled worker, the position of the cursor 310 determines the location of the subsequent user interaction. The pointing device 225 could be in the form of a mouse, a touchpad, a trackball, joystick, a finger-tracking, pen-tracking or stylus tracking element embedded in a touchscreen, and the like. In some implementations of the electronic device 110, the pointing device 225 may be integrated with the user input device 210 and/or the user output device 220, for example, in a tablet computer device, the touchscreen functions as the user input device 210, the user output device 220 as well as the pointing device 225. The electronic device 110 includes a network communication interface 230 (such as a modem, a network card and the like) for two-way communication over the communication network 130. The electronic device 110 also includes a processor 240 coupled to the user input device 210, the user output device 220, the pointing device 225 and the network communication interface 230. The processor 240 is configured to execute various methods, including those described herein below. To that end the processor 240 has a memory 245 (in the form of Random Access Memory (RAM), flash memory, or the like), or is communicatively coupled to the memory 245 that stores computer readable commands which, when executed, cause the processor 240 to execute the various methods described herein. The electronic device 110 comprises hardware and/or software and/or firmware, as is known in the art, to execute various applications, such as a search application 250 associated with a search engine. Generally speaking, the purpose of the search application 250 is to enable the user (not depicted) to execute a search, such as the above mentioned web search using the above-mentioned search engine.

With reference again to FIG. 1, in the illustrated implementation of the present technology, the communication network 130 is the Internet. In other implementations of the present technology, the communication network 130 can be other than the Internet, such as a wide-area communication network, a local-area communication network, a private communication network and the like. In the communication network 130, communication occurs over various types of communication links such as wireless links (such as the Wireless Fidelity, or WiFi® for short, Bluetooth® or the like) or wired links (such as a Universal Serial Bus or USB-based connection or Ethernet based connection, for example).

Also coupled to the communication network 130 is a server 120. The server 120 is connected to the electronic device 110 via the communication network 130. The server 120 is sometimes referred to herein as "remote server" 120 as it is disposed separated from the electronic device 110 and connected thereto via the communication network 130. The server 120 could be connected a plurality of electronic devices 110. The server 120 could also be connected to other servers 120, such as but not limited to network resource servers, application servers, network configuration servers, via the communication network 130.

The server 120 can be implemented as a conventional computer server. In an example of an implementation of the present technology, the server 120 can be implemented as a Dell™ PowerEdge™ Server running the Microsoft™ Windows Server™ operating system. The server 120 could also be implemented as other kinds of network equipment such as, but not limited to, a router, a switch, or a gateway, a base station and the like. The server 120 can be implemented in any suitable hardware and/or software and/or firmware, or a combination thereof. In the depicted non-limiting implementation of present technology, the server 120 is a single server. In alternative non-limiting implementations of the present technology, the functionality of the server 120 may be distributed and may be implemented via multiple servers. The implementation of the server 120 is well known. However, briefly speaking, the server 120 comprises a network communication interface similar to the network communication interface 230 of the electronic device 110 structured and configured to communicate with the electronic device 110 and other devices coupled to the communication network 130. The server 120 further comprises at least one computer processor similar to the processor 240 of the electronic device 110 operationally connected with a memory similar to the memory 245 of the electronic device 110 and the network communication interface 230. The processor 240 of the server 120 is structured and configured to execute various methods to be described herein.

In the illustrated implementation, the server 120 is a search engine server associated with the search application 250 mentioned above. The server 120 is generally configured to (i) conduct searches; (ii) execute analysis of search results and perform ranking of search results; (iii) group search results and compile the search engine result page (SERP) to be output to the electronic device 110. The search engine server 120 is communicatively coupled (or otherwise has access) to a search cluster 122. According to some implementations of the present technology, the search cluster 122 performs web searches (e.g., general and/or vertical searches) in response to a search query 350 (FIG. 3) input by the user accessing the search application 250 on the electronic device 110 and outputs search results for presentation to the user in a search engine results page (SERP). Within these non-limiting implementations of the present technology, the search cluster 122 comprises or otherwise has access to a database 124. As is known to those of skill in the art, the database 124 stores information associated with a plurality of resources potentially accessible via the communication network (for example, those resources available on the Internet). The process of populating and maintaining the database 124 is generally known as "crawling". It should be expressly understood that in order to simplify the description presented herein below, the configuration of the search cluster 122 has been greatly simplified. It is believed that those skilled in the art will be able to appreciate implementational details for the search cluster 122 and for components thereof.

According to non-limiting implementations of the present technology, the server 120 is further configured to generate suggested search queries 360 (FIG. 3) related to the search query 350 received from the user of the search application 250. To that end, the server 120 comprises or has access to a suggestion module 126. In the illustrated non-limiting implementation of the present technology, the suggestion module 126 comprises or has access to one or more databases 128 for accessing information related to previous searches conducted by users of the search application 250. In some implementations of the present technology, the suggestion module 126 is implemented as part of the search cluster 122.

In the depicted non-limiting implementation of the present technology, the suggestion module 126 is a single suggestion module. In addition, the suggestion module 126 comprises or has access to one or more databases 128. In alternative non-limiting implementations of the present technology, the server 120 could be communicatively coupled (or otherwise has access) to a plurality of suggestion modules 126. In some implementations, a given suggestion module 126 is responsible for generating suggested search queries 360 of a particular type. For example, merely for the purposes of ease of illustration, a particular suggestion module 126 could be configured to generate suggested search queries 360 for search queries 350 relating to drugs. In the implementation with a plurality of suggestion modules 126, it is contemplated that each suggestion module 126 could be configured to generate a particular type of suggested search queries 360, for example for search queries related to people, sports, science. In these alternative non-limiting implementations of the present technology having a plurality of suggestion modules 126, it should be understood that a given one of the plurality of suggestion modules 126 could comprise or have access to one or more databases 128. These one or more databases 128 host data associated with the particular type of query suggestions that the associated suggestion module 126 is configured to generate. It should be expressly understood that the number of suggestion modules 126, or their function is not meant to be limited.

Search Application

The implementation of the search application 250 is not particularly limited. One example of the search application 250 may include a user accessing a web site associated with a search engine to access the search application 250. For example, the search application can be accessed by typing in an URL associated with Yandex™ search engine at www.yandex.ru. It should be expressly understood that the search application 250 can be accessed using any other commercially available or proprietary search engine.

In alternative non-limiting implementations of the present technology, the search application 250 may be implemented as a browser application on a portable device (such as a wireless communication device). For example (but not limited to) those implementations, where the electronic device 110 is implemented as a portable device, such as for example, Samsung™ Galaxy™ SIII, the electronic device 110 may be executing a Yandex browser application. It should be expressly understood that any other commercially available or proprietary browser application can be used for implementing non-limiting implementations of the present technology.

Figure 7:
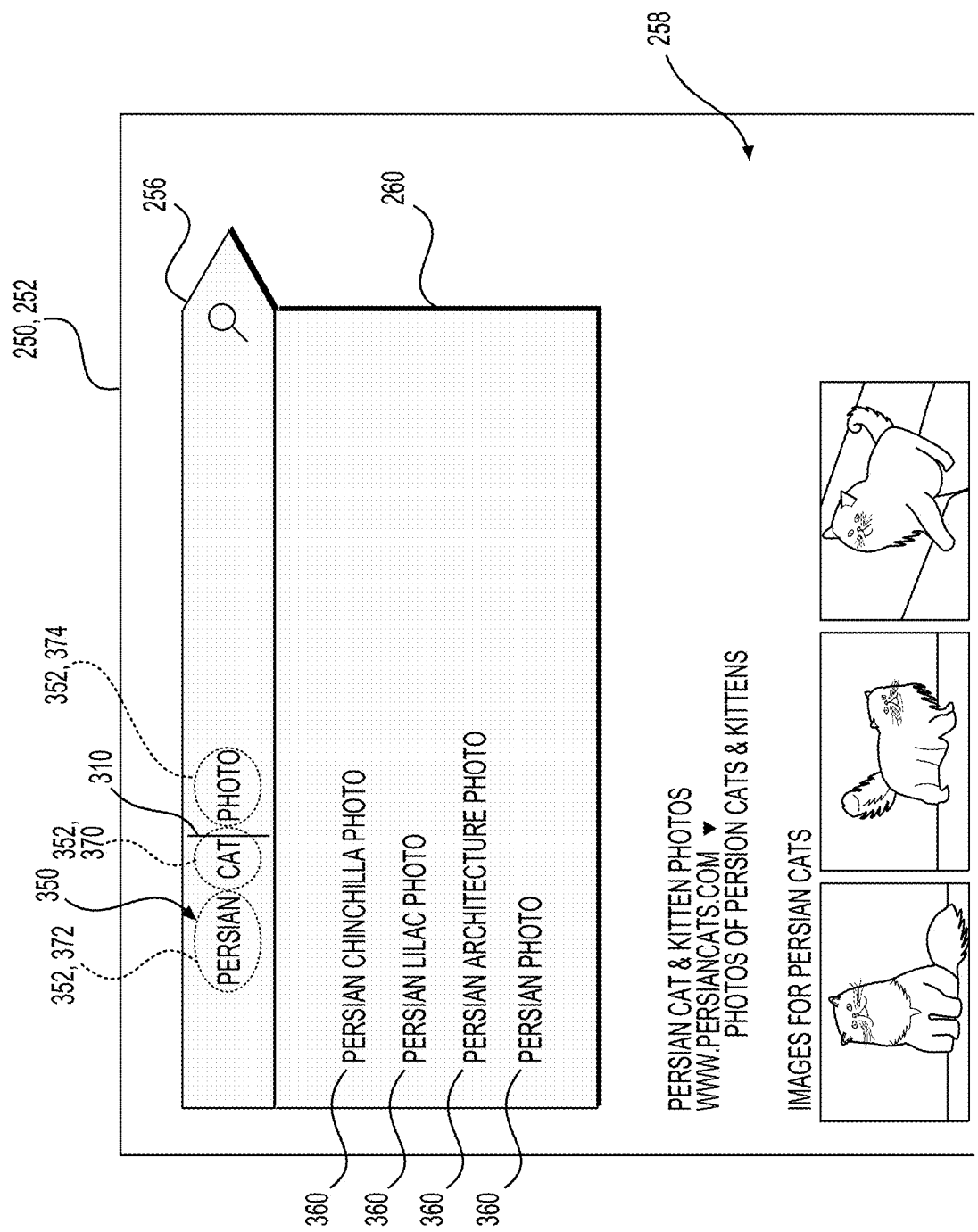
FIG. 7 is a schematic illustration of the search application window of FIG. 3 with the cursor being positioned in a search term ending position, and showing a corresponding suggested search query interface and a search result interface in accordance with a non-limiting implementation of the present technology.

FIG. 7 shows a portion of a search application window 252 presented by the search application 250 in accordance with an implementation of the present technology. The search application window 252 has a search query interface 256, a search result interface 258, a suggested search query interface 260 and a cursor 310.

The general purpose of the search query interface 256 is to enable a user to enter a search query 350 for which the user is seeking search results. The user enters a search query 350 in the search query interface 256 using the user input device 210 of the electronic device, for example, the keyboard.

The general purpose of the search result interface 258 is to present to the user the search results that are obtained by processing the search query 350. The processing of the search query 350 for generation of the search results will not be described herein in any further detail.

With reference to FIG. 7, the user enters an exemplary search query 350 "PERSIAN CAT PHOTO" into the search query interface 256. The exemplary user-input search query 350 entered by the user "PERSIAN CAT PHOTO" comprises three search query terms 352 "PERSIAN", "CAT", and "PHOTO".

Responsive to the user-input search query 350, an exemplary search engine result page (SERP) including the search engine results www.persiancats.com and various images for persian cats is displayed in the search result interface 258. In the illustrated implementation, the search query interface 256 is disposed in the upper portion of the search application window 252 while the search result interface 258 is displayed in the lower portion of the search application window 252. It is however contemplated that the positions of either of the search query interface 256 and/or search result interface 258 could be different from that shown herein.

The suggested search query interface 260 is used to display to the user representations of one or more suggested search queries 360 related to the search query 350 entered by the user. The suggested search queries 360 are generated to aid and guide the searches being performed by the user. As will be described below in more detail, the one or more suggested search queries 360 are generated by processing the search query 350 based on the position of the cursor 310. The method 400 of generating suggested search queries 360 will be described below in further detail. In the illustrated example of FIG. 7, four suggested search queries 360, namely "PERSIAN CHINCHILLA PHOTO", "PERSIAN LILAC PHOTO", "PERSIAN ARCHITECTURE PHOTO" and "PERSIAN PHOTO", are presented to the user in a suggested search query interface 260 in the form of a drop-down list extending downwards from a lower edge of the search query interface 256 and disposed above the search engine results. The list of suggested search queries 360 could alternately be presented as a drop-down list extending from a lower edge of the search query interface 256, from a side thereof, or extending upwards therefrom.

In some implementations, as in FIGS. 3 to 5 and 7, the suggested search query interface 260 is disposed in the upper portion of the search application window 252 below the search query interface 256 and above the search results interface 258. In some implementations, as in FIG. 6, the suggested search query interface 260 is disposed in the lower portion of the search application window 252 below the search query interface 256 and the search results interface 258. It is contemplated that, the suggested search query interface 260 could be configured differently from that shown herein. For example, the suggested search queries 360 could be interspersed with the search engine results displayed within the search application window 252 so as to form a plurality of suggested search query interfaces 260.

As mentioned above, the cursor 310 is controlled by the pointing device 225 such as a mouse, or by a user's finger on a touch screen. The cursor 310 can be placed in the search query interface 256 to enter the search query 350 or to modify the entered search query 350. In the present implementation of the technology, the suggested search queries 360 presented to the user are determined based on the current position of the cursor 310 in the search query interface 256 as will be described below. The cursor 310 can be placed in the search result interface 258 or the suggested search query interface 260 to view and/or select one of the elements (such as the search results or suggested search queries 360) presented therein.

Figure 4:
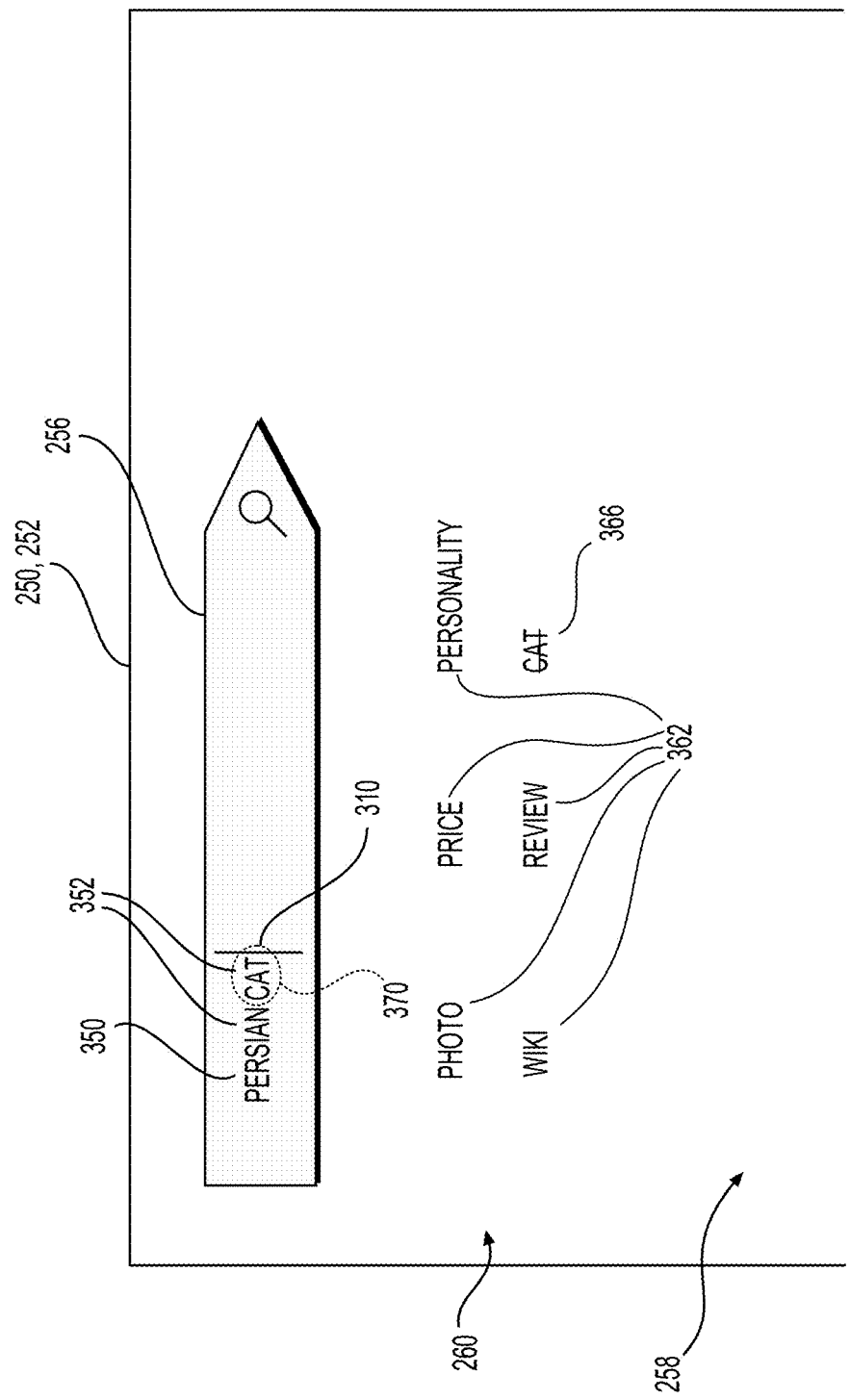
FIG. 4 is a schematic illustration of the search application window of FIG. 3 before the search query has been entered completely in the search query interface thereof, with the cursor being positioned in a search query ending position, and showing a corresponding suggested search query interface in accordance with a non-limiting implementation of the present technology.

With reference to FIG. 4, while the user is typing the search query 350 in the search query interface 256, the cursor 310 is positioned at the end of the search query 350, or in a search query ending position. FIG. 7 shows the cursor 310 placed in the interior of the search query 350. In the illustrated example of FIG. 7, after having entered the search query 350 "PERSIAN CAT PHOTO", the user moves the cursor 310 to the interior of the search query 350, for example, with an intention of modifying the entered search query 350. In either case, the suggested search queries 360 presented to the user are generated based on the search query 350 "PERSIAN CAT PHOTO" and the current position of the cursor 310 as will be detailed below.

Figure 8:
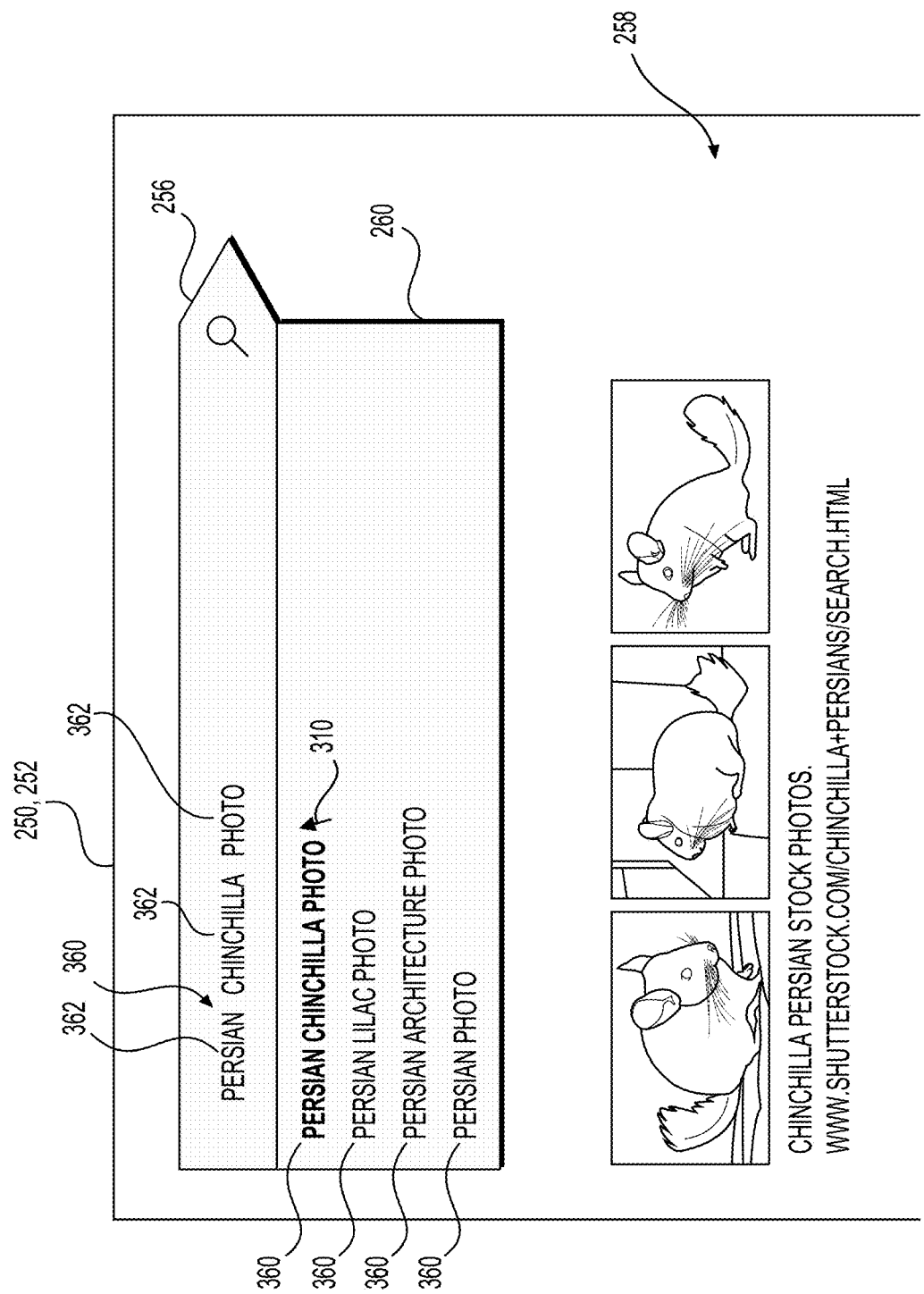
FIG. 8 is a schematic illustration of the search application window of FIG. 7 after selection of a suggested search query presented therein in accordance with a non-limiting implementation of the present technology.

A particular one of the suggested search queries 360 can be selected by placing the cursor 310 on that suggested search query 360 and clicking thereon to complete selection of the suggested search query 360. With reference to FIG. 8, when the user selects one of the suggested search queries 360, for example, "PERSIAN CHINCHILLA PHOTO", the user-entered search query 350 "PERSIAN CAT PHOTO" is replaced by the selected suggested search query 360 "PERSIAN CHINCHILLA PHOTO" in the search query interface 256 and the search results interface 258 is updated to display results related to the selected suggested search query 360.

Presentation of Suggested Search Queries

With reference to FIG. 7, each suggested search query 360 includes one or more suggested search query words or terms 362. Thus, the suggested search query 360 "PERSIAN CHINCHILLA PHOTO" includes three suggested search query words 362, namely "PERSIAN", "CHINCHILLA" and "PHOTO".

As can be seen in FIG. 7, each suggested search query 360 is closely related in structure to the search query 350 currently in the search query interface 256. Each suggested search query 360 is generated by performing a suggest action (discussed further below) on the search query 350. In general, a suggested search query 360 can be described as a modification of the corresponding search query 350. For example, the suggested search query 360 could be described as the search query 350 with one or more additional suggested search query words 362 inserted therein. As another example, the suggested search query 360 could be described as the search query 350 with a search query term 352 being replaced by a suggested search query term 362. As yet another example, the suggested search query 360 could be described as the search query 350 with a search query term 352 being deleted therefrom. As such, the suggested search query 360 generally has at least one suggested search query term 362 that is common with a corresponding search query term 352 of the received search query 350. For example, in FIG. 7, the suggested search query 360 "PERSIAN CHINCHILLA PHOTO" and the related search query 350 "PERSIAN CAT PHOTO" have the search query words 352, 362 "PERSIAN" and "PHOTO" in common.

In the example illustrated in FIGS. 7 and 8, each of the suggested search queries 360 presented to the user in the search query interface 260 is presented in its entirety, including all of the suggested search query words 362, whether or not a particular suggested search query term 362 is already present in the search query 350 entered by the user. In general, the suggested search query interface 260 displays representations of each suggested search query 360. The representation of a suggested search query 360 could be the entire suggested search query 360 (FIG. 7), one or more suggested search query words 362 (FIGS. 3 to 6), or a deletion 366 (FIGS. 5 and 6) as will be explained below.

In some implementations, such as in the illustrated example of FIGS. 3 to 6, a suggested search query 360 is presented to the user in the form of one or more suggested search query terms 362 which are representative of the suggested search query 360 and the corresponding modification of the related search query 350 currently in the search query interface 256.

Figure 3:
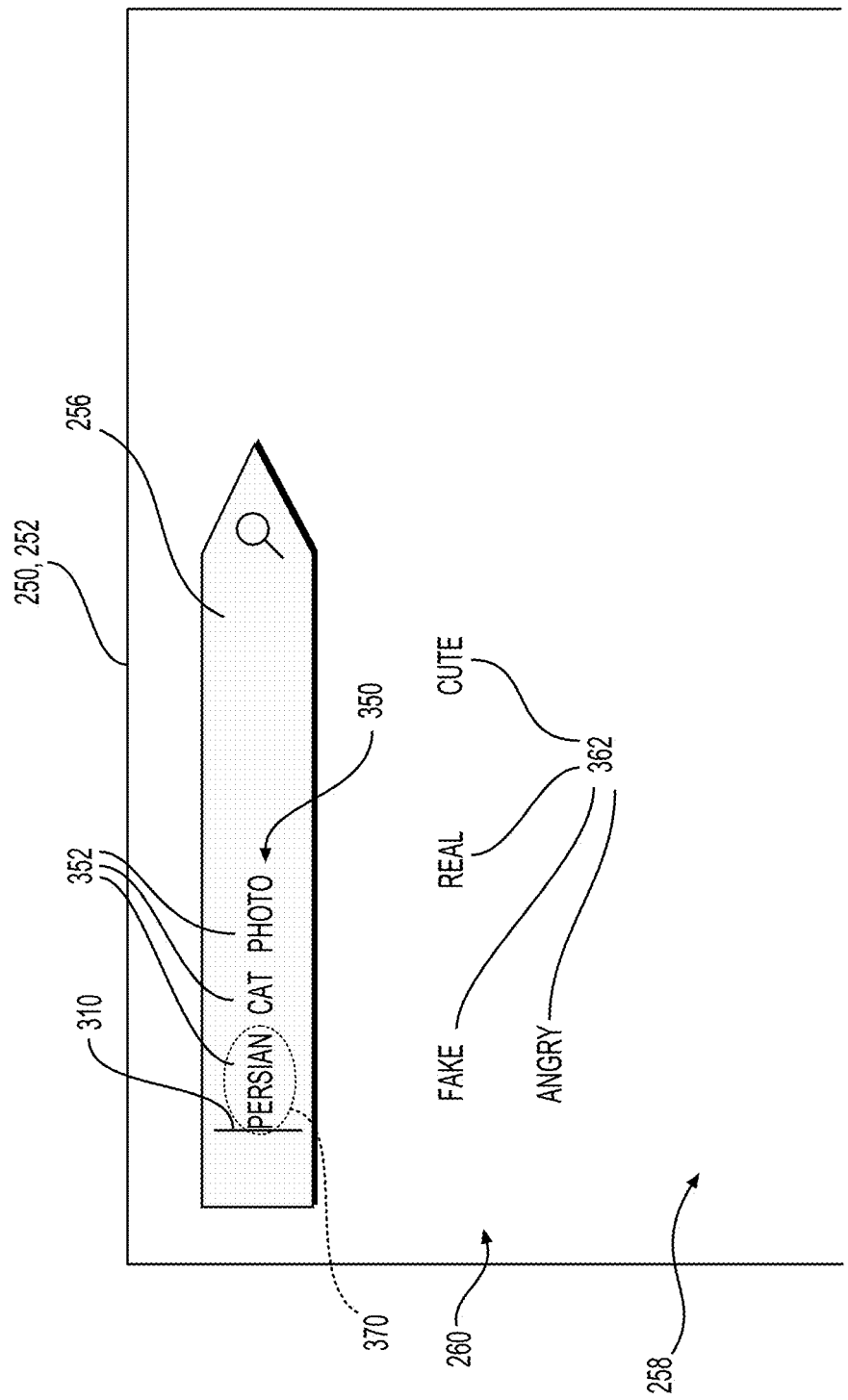
FIG. 3 is a schematic illustration of a portion of a first search application window with a search query having been entered in a search query interface thereof and a cursor being positioned in the search query interface in a search query beginning position, and showing a suggested search query interface in accordance with a non-limiting implementation of the present technology.
Figure 9:
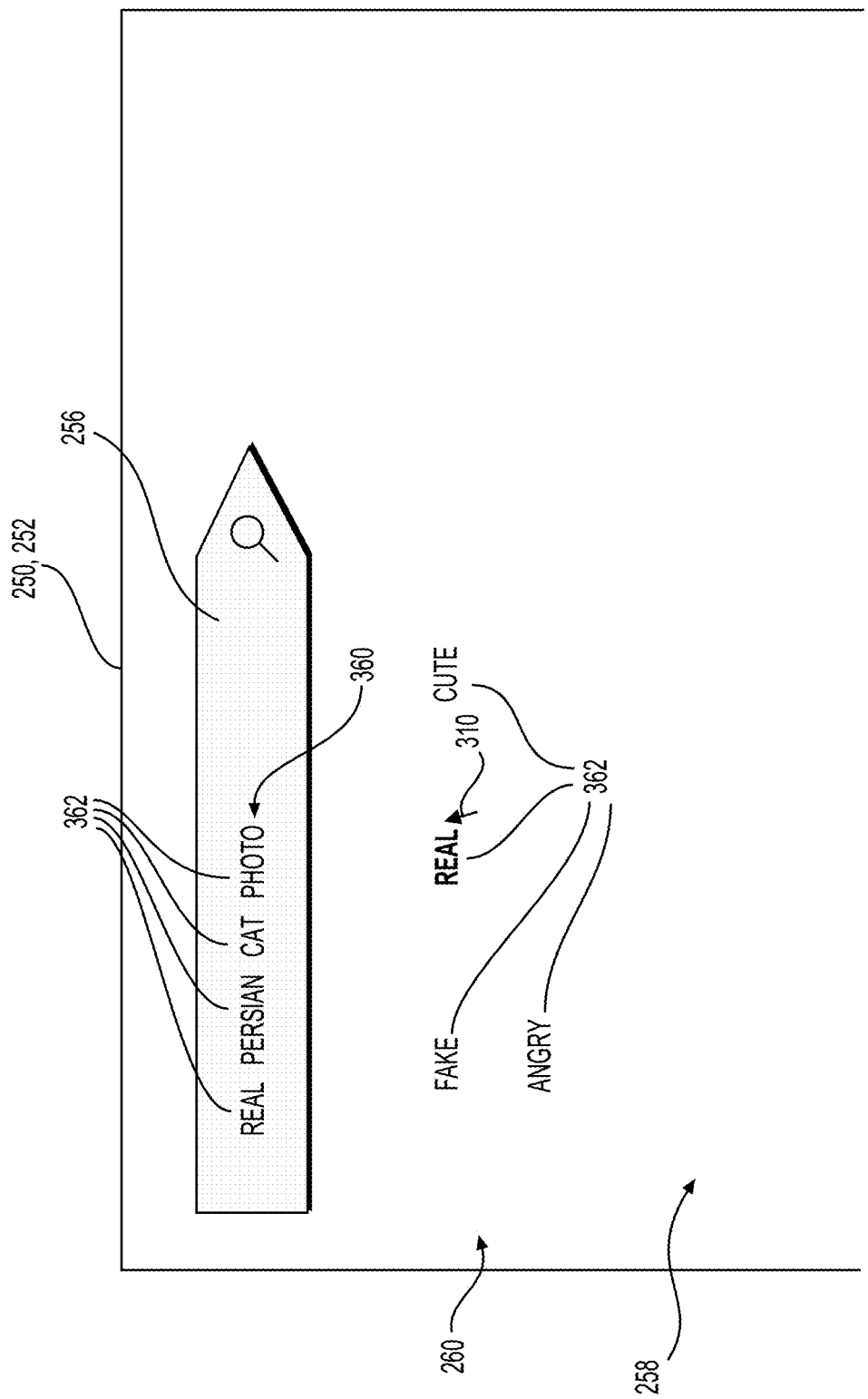
FIG. 9 is a schematic illustration of the search application window of FIG. 3 after selection of a suggested search query presented therein in accordance with a non-limiting implementation of the present technology.

In some implementations, the suggested search query term 362 represents a suggested search query 360 that corresponds to a modification of the search query 350 by insertion of the displayed suggested search term 362 in the search query 350 at the position of the cursor 310. FIG. 3 shows a search application window 252 in which the user has entered a search query 350 "PERSIAN CAT PHOTO" in the search query interface 256 and then moved the cursor 310 to the front of the search query term 352 "PERSIAN". As a result, suggested search query words 362 "FAKE", "REAL", "CUTE", and "ANGRY" are displayed in the search query interface 260. As can be seen in FIG. 9, when the user selects one of the suggested search query words 362, for example, "REAL", the search query 350 "PERSIAN CAT PHOTO" is replaced by a corresponding suggested search query "REAL PERSIAN CAT PHOTO". Thus in this implementation, the suggested search query term 362 "REAL" represents a suggested search query 360 "REAL PERSIAN CAT PHOTO" which is a modification of the search query 350 "PERSIAN CAT PHOTO" by inserting therein the selected suggested search query term 362 "REAL" in the latest position of the cursor 310 (before the cursor 310 was moved to the suggested search query interface 260 perform the selection of the search query term 362 "REAL").

Figure 5:
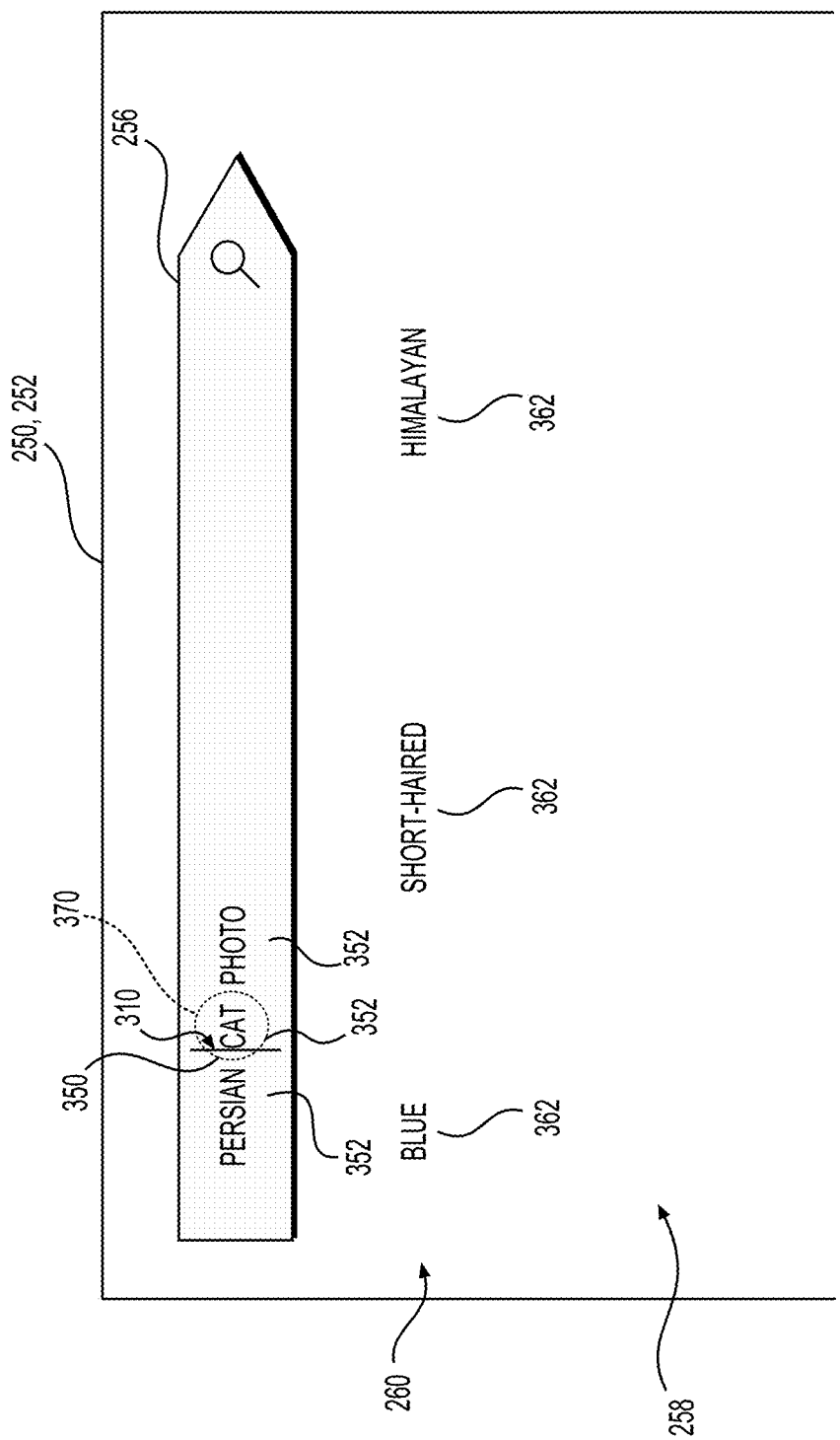
FIG. 5 is a schematic illustration of the search application window of FIG. 3 with the cursor being positioned in a search term beginning position, and showing a corresponding suggested search query interface in accordance with a non-limiting implementation of the present technology.

Similarly, in the illustrated examples of FIGS. 4 and 5, the suggested search queries 360 are represented in the form of one or more search query words 362. Although not shown, if the user selects a representation of one of the suggested search queries 360, for example, the suggested search query term 362 "SHORT-HAIRED" in FIG. 5, the user-entered search query 350 "PERSIAN CAT PHOTO" in the search query interface 256 will be replaced by a suggested search query 360 "PERSIAN SHORT-HAIRED CAT PHOTO" corresponding to the selected search query term 362 and the particular position of the cursor 310.

Figure 10:
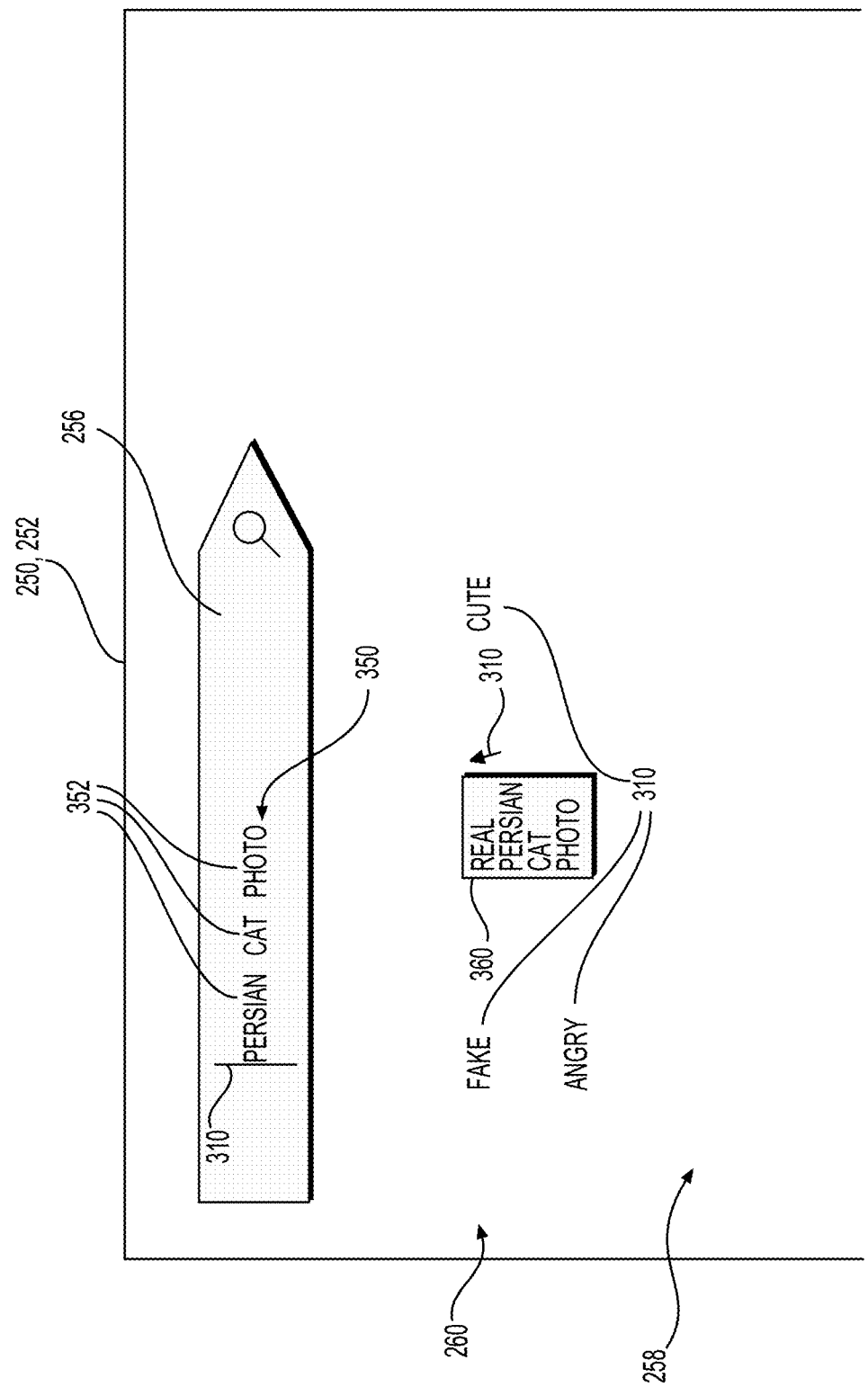
FIG. 10 is a schematic illustration of the search application window of FIG. 9 before completing selection of a suggested search query presented therein in accordance with a non-limiting implementation of the present technology.

The presentation of the suggested search query term 362 instead of the entire suggested search query 360 economizes space occupied by the search query interface 260 in the search application window 252, which is especially desirable when the search application 250 is being used on portable electronic devices 110 with relatively small display screens 220, while still providing the convenience afforded to the user by the search query suggestion functionality. It is intended that the user would understand how a particular suggested search query term 362 is representative of the corresponding suggested search query 360, and the corresponding modification of the search query 350. Thus, in the illustrated example of FIG. 3, it is intended that the user would understand that suggested search query term 362 shown in the suggested search query interface 260 would be inserted in the search query 350 in the search query interface 256 in the position of the cursor 310. However, as shown in FIG. 10, in some implementations, in order to facilitate the user's understanding, when the user places the cursor 310 over a suggested search query term 362 "REAL" presented in the search query interface 260 without clicking on it to complete the selection of that suggested search query term 362 "REAL", the entire suggested search query 360 "REAL PERSIAN CAT PHOTO" is displayed to the user in the search query interface 260.

Figure 6:
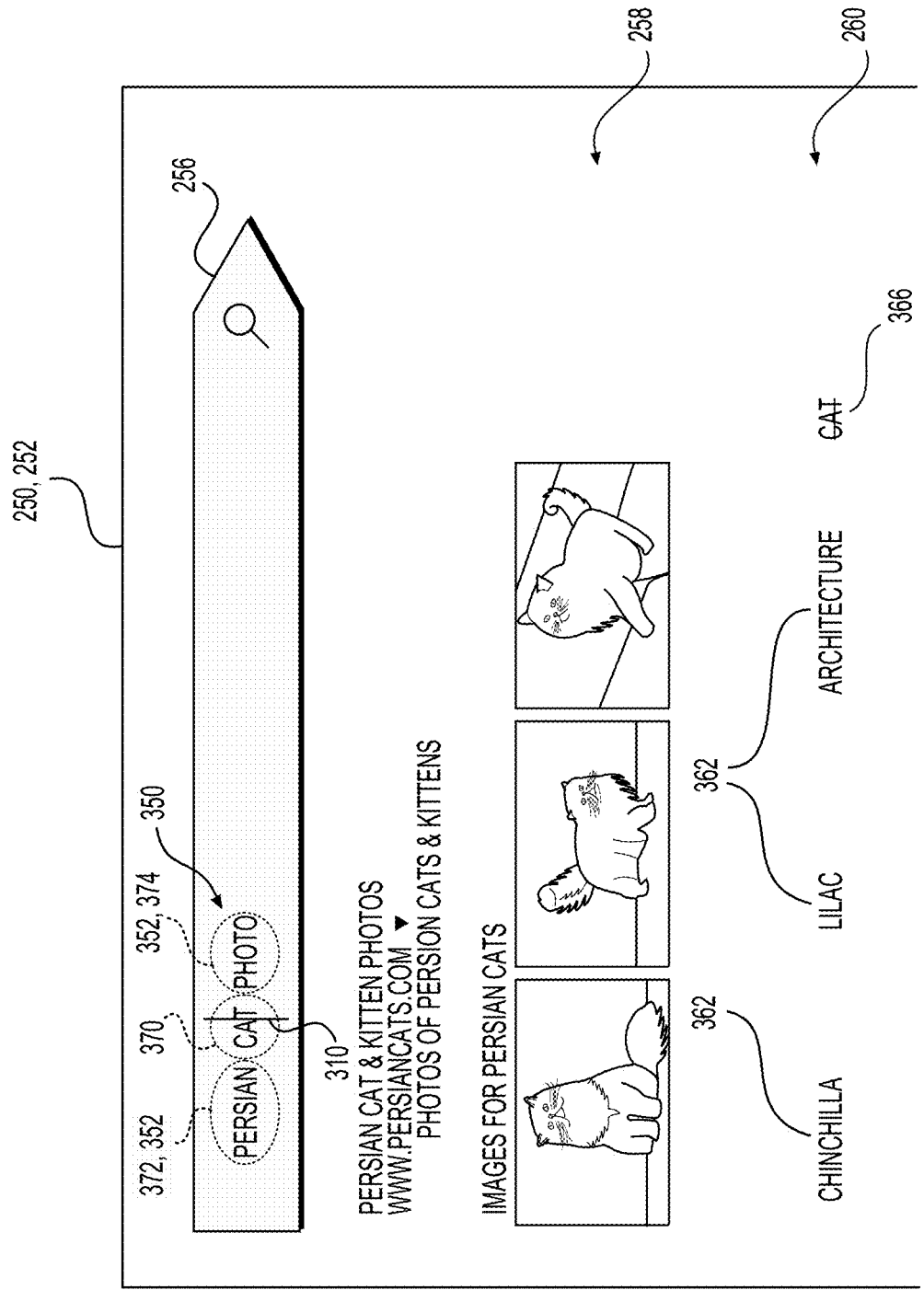
FIG. 6 is a schematic illustration of another implementation of the search application window with the cursor being positioned in a search term interior position, and showing a corresponding suggested search query interface and a search result interface in accordance with a non-limiting implementation of the present technology.

FIG. 6 shows a search application window 252 in which the user has entered a search query 350 "PERSIAN CAT PHOTO" in the search query interface 256 and then moved the cursor 310 to the interior of the search query term 352 "CAT". As a result, suggested search query words 362 "CHINCHILLA", "LILAC", and "ARCHITECTURE" are displayed in the search query interface 260. Each of these suggested search query words 362 represents a corresponding suggested search query 360 which is formed from the search query 350 by replacing the search query term 352 having the cursor 310 therein with the suggested search query term 362. Thus, although not shown, if the user selects one of the suggested search query words 362 of FIG. 6, for example, "CHINCHILLA", the search query 350 "PERSIAN CAT PHOTO" is replaced by the suggested search query 360 "PERSIAN CHINCHILLA PHOTO" corresponding to the selected suggested search query term 362 "CHINCHILLA" and the search query word interior cursor position. Thus in this implementation, the suggested search query term 362 "CHINCHILLA" represents a suggested search query 360 "PERSIAN CHINCHILLA PHOTO" which has the suggested search query term 362 "CHINCHILLA" in place of the search query term 352 "CAT" having the cursor 310 positioned therein. It is intended that the user would understand that when the cursor 310 is placed in the middle of a search query term 352 in the search query interface 256, selection of a suggested search query term 362 shown in the suggested search query interface 260 would replace the search query term 352 having the cursor 310 positioned therein. However, as described above, in some implementations, in order to facilitate the user's understanding, when the user places the cursor 310 over a suggested search query term 362 "CHINCHILLA" presented in the search query interface 260 without clicking on it to complete the selection of that suggested search query term 362 "CHINCHILLA", the entire suggested search query 360 "PERSIAN CHINCHILLA PHOTO" is displayed to the user in the search query interface 260.

Still referring to FIG. 6, in which the cursor 310 is positioned at the end of a search query term 352 "CAT" in the search query interface 256, one of the representations of the suggested search query 360 in the suggested search query interface 260 is a deletion 366 of a search query term 352 "CAT". The deletion 366 "~~CAT~~" represents a suggested search query 360 "PERSIAN PHOTO" which is formed from the search query 350 "PERSIAN CAT PHOTO" by deleting the search query term 352 "CAT". It should be understood that the deletion 366 "~~CAT~~" as shown herein is exemplary, and the deletion 366 can be indicated in other ways, for example, by a double-underline, in a particular font or color, or the like.

Thus, a suggested search query 360 can be presented to the user in entirety, as a portion thereof including one or more search query words 362, or as a deletion 366. In the illustrated implementation, each suggested search query 360, whether presented in entirety (as in FIG. 7), or in part (as in FIGS. 3 to 6), is presented as a user selectable element so that if one of the suggested search queries 360 is found by the user to be of interest, the user can view the SERP related to the suggested search query 360 simply by selecting the representation of the corresponding suggested search query 360 instead of having to type in the suggested search query 360 in entirety or in part into the search query interface 256.

In the illustrated implementations of the present technology, the representations of the suggested search queries 360 are presented to the user as soon as the user begins typing a search query 350 into the search query interface 256, and updated dynamically as the user continues to type the search query 350. In the implementations illustrated herein, the suggested search queries 360 appear automatically in a sense of not requiring the user to take any affirmative actions. It is contemplated that the search application 250 may provide a suggested search query function that can be turned on and off by the user. In this case, the representations of the suggested search queries 360 would be presented to the user in response to the user positively indicating his or her intent to use the particular suggested search query functionality provided by the search application 250.

Method

A method 400 according to an implementation of the present technology, for generating suggested search queries 360 will now be described below with reference to FIGS. 1 to 13.

Figure 13:
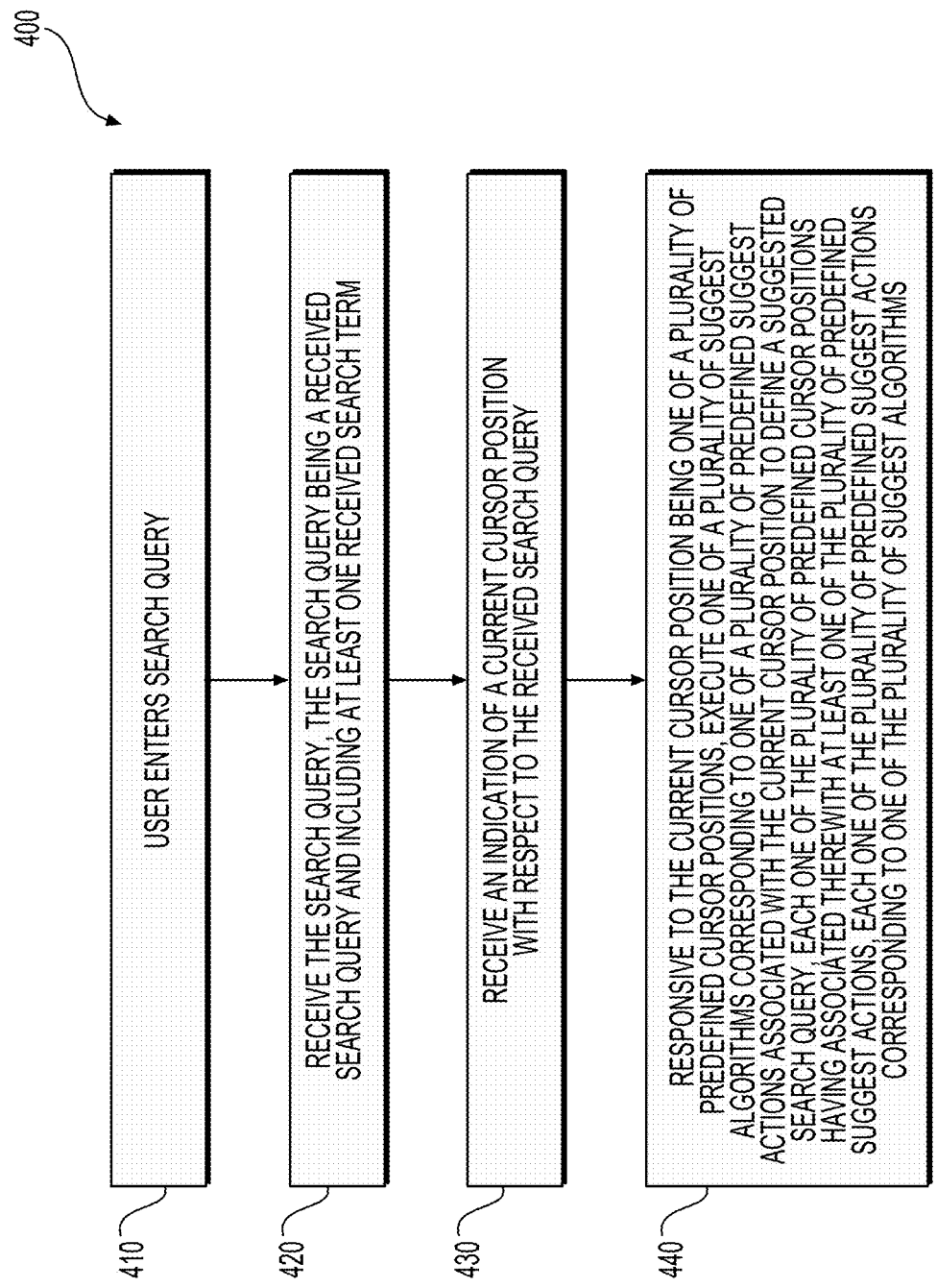
FIG. 13 is a flow chart of a method for generating suggested search queries in accordance with a non-limiting implementation of the present technology.

With reference to FIGS. 1, 2 and 13, the method 400 is executed by the processor 240 of the server 120 that is communicatively coupled to the search application 250 on the electronic device 110. It is also contemplated that some of the steps of the method 400 described below could be executed in part or entirely by the processor 240 of the electronic device 110 on which the search application 250 is being executed.

The method 400 for generating suggested search queries 360 starts at step 410 when the user of electronic device 110 launches the search application 250 and begins entering a search query 350 into the search query interface 256.

At step 420, the processor 240 receives the search query 350 entered by the user. As such, the search query 350 is sometimes referred to hereinafter as the received search query 350, and the search query terms 352 are sometimes referred to hereinafter as the received search query terms 352. In the illustrated implementation, the sending of the search query 350 to the processor 240 is triggered by user activity in the search query interface 256 such as entering of a character therein or repositioning of the cursor 310 therein. Thus, while the user is typing the search query 350, the partially completed search query 350 is sent to the processor 240 after the input of each character by the user. Once the user stops typing the search query 350, the search query 350 is sent to the processor 240 when there is a change in the position of the cursor 310. It is contemplated that the search query 350 is sent to the processor 240 periodically, or triggered by a different event.

At step 430, the processor 240 receives an indication of a current cursor position of the cursor 310 with respect to the received search query 350. As will be understood, while the search query 350 is being entered by the user, the cursor 310 is positioned at the end of the search query 350 as shown in FIG. 4. However, in some instances, the user may use the pointing device 225 to move the cursor 310 to another location in the search query interface 256, perhaps with an intention of modifying the search query 350 that has already been entered. The position of the cursor 310 in the search query 350 is indicative of the desired modification to the search query 350 already entered into the search query interface 256. In the illustrated implementation, a current cursor position with respect to the search query 350 is sent to the processor 240 along with the search query 350. Thus, in the illustrated implementation, the steps 420 and 430 occur simultaneously, but it is contemplated the step 430 could occur after the step 420 and/or separately therefrom.

It should be understood that the cursor 310 can be moved to other locations of the search application window 252 other than the search query interface 256. However, the method 400 for generating suggested search queries 360 as described herein is based on the position of the cursor 310 within the search query interface 256. Thus, the current cursor position is defined with respect to the position of the cursor 310 in the search query interface 256 and with respect to the search query 350 entered therein. If the cursor 310 is moved outside the search query interface 256, for example, to one of the search results, the current cursor position, for the purposes of the method 400, continues to be the last position of the cursor 310 within the search query interface 256. Accordingly, if the cursor 310 is moved out of the search query interface 256, the suggested search queries 360 displayed in the search application window 252 are the suggested search queries 360 generated for the last position of the cursor within the search query interface 256.

At step 440, responsive to the current cursor position being one of a plurality of predefined cursor positions, the processor 240 executes one of a plurality of a suggest algorithms corresponding to one of a plurality of a predefined suggest actions that is associated with the current cursor position in order to define a suggested search query 360.

As mentioned above, the position of the cursor 310 relative to the search query 350 entered in the search query interface 256 can be indicative of the modification to the search query 350 desired by the user. Therefore, the suggested search queries 360 generated by implementing the method 400 are based on the position of the cursor 310. The method 400 generates suggested search queries 360 if the current cursor position is one of a plurality of predefined cursor positions. In the illustrated implementation, the predefined cursor positions include: a search query beginning cursor position (FIG. 3), a search query ending cursor position (FIG. 4), a search term beginning cursor position (FIGS. 3 and 5), a search term ending cursor position (FIGS. 4 and 7), and a search term interior cursor position (FIG. 6).

Each of the predefined cursor positions is associated with a predefined suggest action that relates to a type of modification made to the received search query 350 in order to generate a suggested search query 360. Thus, the method 400 has a plurality of predefined suggest actions which are used to generate suggested search queries 360 from the received search query 350. In the illustrated implementation of the method 400, the predefined suggest actions include: an inserting suggest action for inserting a suggest word 362 in the received search query 350, a deleting suggest action for deleting a cursor indicative search term 370 of the at least one received search term 352 in the received search query 350, and a replacing suggest action for replacing the cursor indicative search term 370 in the received search query 350.

Each one of the plurality of predefined cursor positions is associated with at least one of the plurality of predefined suggest actions such that when the current cursor position is one of the predefined cursor positions, the suggested search query 360 is generated by performing on the received search query 350, one of the suggest actions associated with that particular predefined cursor position. Each predefined cursor position could be associated with a single suggest action, or with multiple suggest actions.

In the illustrated implementation, the search query beginning cursor position is associated with the inserting suggest action. In the illustrated implementation, the search query ending cursor position is associated with the inserting suggest action and the deleting suggest action. In the illustrated implementation, the search term beginning cursor position is associated with the inserting suggest action. In the illustrated implementation, the search term ending cursor position is associated with the replacing suggest action and the deleting suggest action. In the illustrated implementation, the search term interior cursor position is associated with the replacing suggest action and the deleting suggest action.

Thus, in the above illustrative implementation, each predefined suggest action is associated with one or more of the predefined cursor positions. It is contemplated that in some implementations, each predefined cursor position could be associated with a suggest action that is different from a suggest action associated with another predefined cursor position. Thus, in this implementation each predefined suggest action would be associated with a single predefined cursor position.

Each of the predefined suggest actions has a corresponding suggest algorithm which is executed by the method 400 to generate a suggested search query 360 based on a modification to the received search query 350. Thus, in the illustrated implementation of the method 400, the inserting suggest action has a corresponding insertion suggest algorithm, the deleting suggest action has a corresponding deletion suggest algorithm, and the replacing suggest action has a corresponding replacement suggest algorithm. Implementational details of the specific suggest algorithms will be discussed below in detail.

When the cursor 310 is in one of the predefined cursor positions, the method 400 executes a suggest algorithm corresponding to a suggest action associated with that predefined cursor position. In the example illustrated in FIG. 3, the current cursor position is a search query beginning position associated with the inserting suggest action, and therefore the insertion suggest algorithm is executed responsive to the cursor 310 being placed as shown in FIG. 3.

In some implementations, the current cursor position can correspond to two different predefined cursor positions. For example, the cursor position shown in FIG. 3 corresponds to a search query beginning cursor position and a search term beginning cursor position. In this case, the both predefined cursor positions (search query beginning position and search term beginning position) are associated with the same suggest action (inserting suggest action). Thus, when the cursor 310 is placed in the position shown in FIG. 3, the method 400 executes the insertion suggest algorithm corresponding to the inserting suggest action.

In some implementations, the current cursor position can correspond to two different predefined cursor positions but each of the predefined cursor positions corresponds to a different suggest action than the other predefined cursor position. For example, the cursor position shown in FIG. 4 corresponds to a search query ending cursor position (associated with inserting suggest action and the deleting suggest action) and a search term ending cursor position (associated with replacing suggest action and deleting suggest action).

In some implementations of the method 400, when the current cursor position corresponds to two different predefined cursor positions, each of the suggest actions associated with each of the predefined cursor positions corresponding to the current cursor position is executed. Thus, in this example illustrated in FIG. 4, the method 400 would execute the insertion suggest algorithm, the deletion suggest algorithm as well as the replacement suggest algorithm when the cursor is placed in the cursor position shown in FIG. 4.

In some implementations of the method 400, when the current cursor position corresponds to two different predefined cursor positions, the suggest action(s) that is common to both of the predefined cursor positions corresponding to the current cursor position is executed. Thus, in this example illustrated in FIG. 4, the method 400 would execute the deletion suggest algorithm when the cursor is placed in the cursor position shown in FIG. 4.

In some implementations of the method 400, when the current cursor position corresponds to two different predefined cursor positions, at least one of the suggest actions associated with one or both of the predefined cursor positions corresponding to the current cursor position is executed. Thus, in this example illustrated in FIG. 4, the method 400 would execute at least one of the insertion suggest algorithm, the deletion suggest algorithm and the replacement suggest algorithm when the cursor is placed in the cursor position shown in FIG. 4.

In some implementations of the method 400, the predefined cursor positions are defined such that, each cursor position only corresponds to a single one of the predefined cursor positions. For example, the search query beginning position and search term beginning position could be defined such that a cursor position can only be one of the search query beginning position and search term beginning position, not both. Thus, the position of the cursor 310 in FIG. 3 is the search query beginning position but not the search term beginning position.

In general, if a particular predefined cursor position is associated with more than one suggest action, then the method 400 performs at least one of the associated predefined suggest actions with respect to the received search query 350, i.e. the method 400 executes the suggest algorithm corresponding to at least one of the associated predefined suggest actions. In the illustrated implementations of FIGS. 3 to 7, if the particular cursor position is associated with more than one suggest action, then the method 400 performs each one of the associated predefined suggest actions with respect to the received search query 350, i.e. the method 400 executes each suggest algorithm corresponding to each one of the associated predefined suggest actions. Thus, in the illustrated implementation of the method 400, when the current cursor position is the search query ending cursor position (as in FIG. 4), the insertion suggest algorithm corresponding to the inserting suggest action and the deletion suggest algorithm corresponding to the deleting suggest action are both executed by the processor 240. In this example of FIG. 4, in response to the example search query 350 "PERSIAN CAT" and search query ending cursor position, execution of the insertion suggest algorithm generates the suggested search queries 360 "PERSIAN CAT PHOTO", "PERSIAN CAT PRICE", "PERSIAN CAT PERSONALITY", "PERSIAN CAT WIKI", AND "PERSIAN CAT REVIEW", and execution of the deletion suggest algorithm generates the suggested search query "PERSIAN". It is contemplated however that, in some implementations of the method 400, one or both of the insertion suggest algorithm and the deletion suggest algorithm could be executed if the current cursor position is the search query ending cursor position. For example, if the current cursor position is associated with a plurality of suggest actions, the associated suggest algorithms could be assigned a predefined ranking such that the first ranked suggest action is performed first, and the lower ranked suggest actions are performed only if the execution of the first ranked suggest action generates fewer than a threshold number of suggested search queries 360.

Similarly, in the illustrated implementation of the method 400, when the current cursor position is the search term ending cursor position (as in FIG. 7), the replacement suggest algorithm corresponding to the replacing suggest action and the deletion suggest algorithm corresponding to the deleting suggest action are both executed by the processor 240. In this example of FIG. 7, in response to the example search query 350 "PERSIAN CAT PHOTO" and search term ending cursor position, execution of the replacement suggest algorithm generates the suggested search queries 360 "PERSIAN CHINCHILLA PHOTO", "PERSIAN LILAC PHOTO", and "PERSIAN ARCHITECTURE PHOTO", and execution of the deletion suggest algorithm generates the suggested search query "PERSIAN PHOTO". It is contemplated however that, in some implementations, one or both of the replacement suggest algorithm and the deletion suggest algorithm could be executed if the current cursor position is the search term ending cursor position.

Similarly as well, in the illustrated implementation of the method 400, when the current cursor position is the search term interior cursor position (as in FIG. 6), the replacement suggest algorithm corresponding to the replacing suggest action and the deletion suggest algorithm corresponding to the deleting suggest action are both executed by the processor 240. In this example of FIG. 6, in response to the example search query 350 "PERSIAN CAT PHOTO" and search term interior cursor position, execution of the replacement suggest algorithm generates the suggested search queries 360 "PERSIAN CHINCHILLA PHOTO", "PERSIAN LILAC PHOTO", and "PERSIAN ARCHITECTURE PHOTO", and execution of the deletion suggest algorithm generates the suggested search query "PERSIAN PHOTO". It is also contemplated that, in some implementations, one or both of the replacement suggest algorithm and the deletion suggest algorithm could be executed if the current cursor position is the search term interior cursor position.

In the illustrated implementation of the method 400, the suggested search queries 360 are defined using previous search queries 390 obtained from a previous search query database such as the database 128. The previous search queries 390 could be search queries 350 received from a particular electronic device 110, a particular user, a particular web resource, a particular web resource host, a particular geographic region, and the like. The processor 240 accordingly accesses one or more databases 128 while executing the suggest algorithms to obtain the previous search queries 350 and to determine a suggested search query 360 therefrom.

In general, one or more suggested search queries 360 could be defined as a result of executing each suggest algorithm. It is also contemplated that execution of a particular suggest algorithm with respect to a particular received search query 350 does not result in any suggested search query 360 being defined. Whether or not, any suggested search queries are successfully defined as a result of execution of one or more of the suggest algorithms, when the current cursor position is one of the predefined cursor positions, the processor 240 executes at least one suggest algorithm corresponding to a suggest action associated with the current cursor position.

When one or more suggested search queries 360 are successfully defined by the processor 240 by the execution of one or more algorithms, the method 400 causes presentation of the one or more suggested search queries 360 in the search application window 252 as discussed above. Thus, in the illustrated implementation of the method 400, the defined one or more suggested search queries 360 is sent from the server 120 executing the suggest algorithms to the electronic device 110 executing the search application for presentation to the user.

Suggest Algorithms

The suggest algorithms will be discussed in more detail below with reference to FIGS. 3 to 13.

Insertion Suggest Algorithm

With reference to FIGS. 3, 4, and 5, the inserting suggest action is associated with some of the predefined cursor positions, by which a suggested search query word 362 is inserted in the received search query 350 at the current cursor position to generate a suggested search query 360.

Figure 11:
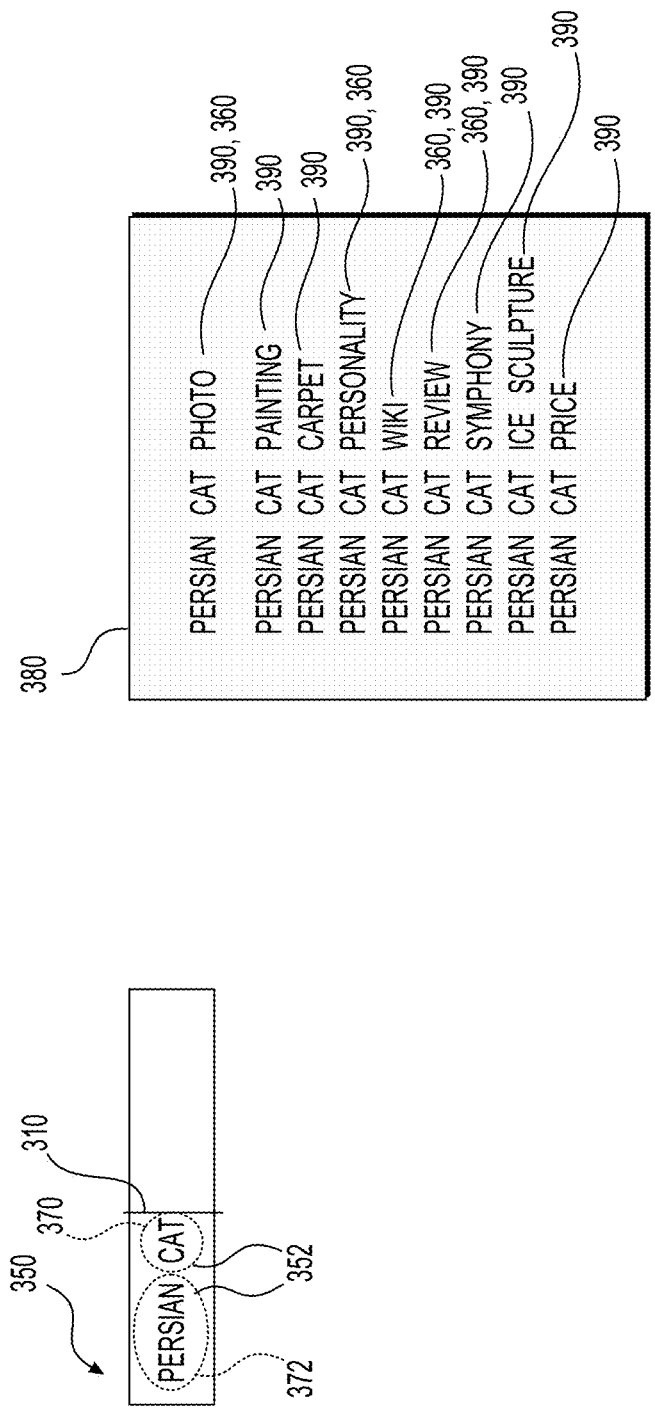
FIG. 11 is a schematic representation of some of the steps of an algorithm for generating suggested search queries as shown in FIG. 4 in accordance with a non-limiting implementation of the present technology.
Figure 12:
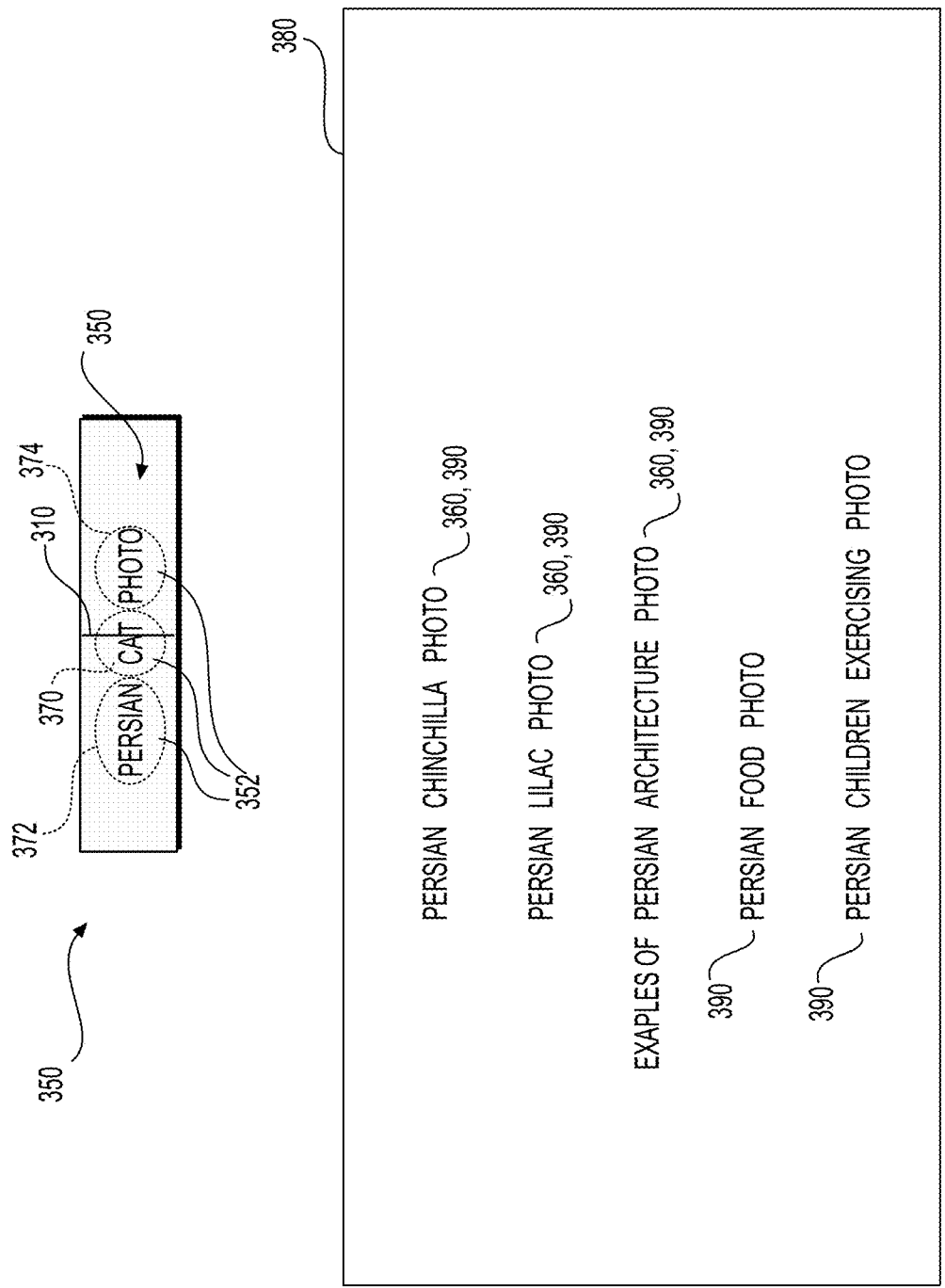
FIG. 12 is a schematic representation of some of the steps of another algorithm for generating suggested search queries as shown in FIG. 6 in accordance with a non-limiting implementation of the present technology.

With reference to FIG. 11, in some implementations, executing the insertion suggest algorithm includes comparing the received search query 350 to previous search queries 390 in the previous search query database 128 to identify a subset 380 of previous search queries 390. In the subset 380 of previous search queries 390, each previous search query 390 has all of the received search query terms 352 in the same order as they appear in the received search query 350 and at least one other suggest search query term 362 in the position corresponding to the current cursor position. The received search query 350 is compared to previous search queries 390 obtained from the database 128. In the example of FIG. 4, in which the received search query 350 is "PERSIAN CAT" and the current cursor position is the search query ending cursor position, the insertion algorithm is performed by identifying in the database 124 a subset 380 of previous search queries 390 including "PERSIAN" and "CAT" and at least one other term 362 at the search query ending position. For example, as shown in FIG. 11, the subset 380 of previous search queries 390 could include search queries "PERSIAN CAT PHOTO", "PERSIAN CAT PAINTING", "PERSIAN CAT CARPET", "PERSIAN CAT PERSONALITY", "PERSIAN CAT WIKI", "PERSIAN CAT REVIEW", "PERSIAN CAT SYMPHONY" AND "PERSIAN CAT ICE SCULPTURE".

From the identified subset 380, one or more previous search queries 390 can then be selected to be presented to the user as a suggested search query (ies) 360. The selection of the suggested queries 360 from the subset 380 of previous search queries 390 can be based on one or more factors such as a search history for the particular user, search history for the particular search session, the particular geographical region in which the search is being performed, semantic or contextual similarity to the received search query 350, and the like. Naturally, any other suitable ranking and selection algorithm can be used. Thus, in the illustrated example of FIG. 4, the previous search query "PERSIAN CAT PHOTO" is selected as a suggested search query 360 on the basis of the user having a search history including the search queries 350 "puma photos" and "jaguar photos". In the illustrated example of FIG. 4, the previous search query "PERSIAN CAT ICE SCULPTURE" is not selected as a suggested search query 360 on the basis of the fact that the current search is being performed in a geographical region that is different from the geographical region where the previous search "PERSIAN CAT ICE SCULPTURE" was performed.

Replacement Suggest Algorithm

With reference to FIGS. 6 and 7, the replacement suggest action is associated with some of the predefined cursor positions, by which a received search query term 352 is replaced with a suggested search query term 362 to generate a suggested search query 360. The received search query term 352 to be replaced is defined based on the current cursor position and referred to herein as the cursor indicative search term 370.

In general, the cursor indicative search term 370 is the search query term 352 occurring immediately after the cursor 310, surrounding the cursor 310, or occurring immediately before the cursor 310.

In the illustrated implementation, when the current cursor position is the search query beginning or search term beginning cursor position as in FIGS. 3 and 5 (i.e. the cursor 310 is positioned immediately before a search term 352), the cursor indicative search term 370 is the search term 352 occurring immediately after the cursor 310. For example, in FIG. 3, the cursor indicative search term 370 is "PERSIAN" occurring immediately after the cursor 310.

In the illustrated implementation, when the current cursor position is the search term interior cursor position as in FIG.

6 (i.e. the cursor 310 is positioned within a search term 352), the cursor indicative search term 370 is the search term 352 having the cursor 310 placed therein. For example, in FIG. 6, the cursor indicative search term 370 is "CAT" surrounding the cursor 310. Similarly, if the cursor 310 is used to select an entire search query term 352 (also referred to in the art as highlighting a received search query term 352), the cursor indicative search term 370 is the received search term 352 that is selected (or highlighted).

In the illustrated implementation, when the current cursor position is the search query ending or search term ending cursor position as in FIG. 4 or 7 (i.e. the cursor 310 is positioned immediately after a search term 352), the cursor indicative search term 370 is the search term 352 occurring immediately before the cursor 310. For example, in FIG. 7, the cursor indicative search term 370 is "CAT" occurring immediately before the cursor 310.

With reference to FIGS. 6, 7 and 11, in the replacement suggest algorithm, the received search query 350 is processed to define the cursor indicative search term 370 based on the current cursor position of the cursor 310. A received search query first portion 372 is defined to be the portion of the received search query 350 occurring before the cursor indicative search term 370 in the received search query 350. A received search query second portion 374 is defined to be the portion of the received search query 350 occurring after the cursor indicative search term 370 in the received search query 350. In the example of FIG. 6, the received search query first portion 372 is "PERSIAN", the received search query second portion 374 is "PHOTO" and the cursor indicative search term 370 is "CAT".

Previous search queries 390 obtained from the database 128 are then compared to the received search query 350 to find a subset 380 of previous search queries 390 where each of the previous search queries 390 includes the received search query first portion 372, the received search query second portion 374, and at least one search term between the received search query first and second portions, 372 and 374, that is other than the cursor indicative search term 370. In the example of FIG. 6, each previous search query 390 in the subset 380 of previous search queries 390 includes the words "PERSIAN" and "PHOTO" and at least one other search term other than "CAT" placed between "PERSIAN" and "PHOTO". For example, the subset 380 of previous search queries includes "PERSIAN LILAC PHOTO", "PERSIAN CHINCHILLA PHOTO", "EXAMPLES OF PERSIAN ARCHITECTURE PHOTO", "PERSIAN FOOD PHOTO", and "PERSIAN CHILDREN EXERCISING PHOTO".

As mentioned above for the insertion algorithm, once a subset 380 of previous search queries 390 is determined by the execution of the replacement algorithm, one or more of the previous search queries 390 in the subset 380 is selected as a suggested search query 360 for presentation to the user based on factors such as, but not limited to, a search history for the particular user, for the particular search session, the particular geographical region in which the search is being performed, semantic or contextual similarity to the received search query 350, and the like. Naturally, any other suitable ranking and selection algorithm can be used.

In some implementations, the previous search queries 390 could also be processed further before presentation to the user as a suggested search query 360. For example, the previous search query "EXAMPLES OF PERSIAN ARCHITECTURE PHOTO" could be processed to delete "EXAMPLES OF" so that the suggested search query 360 mirrors the structure of the received search query 350, i.e. the suggested search query 360 differs from the received search query 350 only by the cursor indicative search term 370 ("CAT" in this example).

The suggested search queries 360 can then be presented to the user in the form of a list of suggested search query words 362 that replace the cursor indicative search term 370 (for example, "CHINCHILLA" and "LILAC"), or in the form of a list of suggested search queries 360 ("PERSIAN CHINCHILLA PHOTO" and "PERSIAN LILAC PHOTO".)

Deletion Suggest Algorithm

In execution of the deletion suggest algorithm, the received search query 350 is processed to define the cursor indicative search term 370, the received search query first portion 372, and the received search query second portion 374 as described above.

Then previous search queries 390 obtained from the database 128 are compared to the received search query to find a previous search query 390 in which the received search query first portion 372 is followed immediately by the received search query second portion 374, without the cursor indicative search term 370 being placed between the received search query first and second portions, 372 and 374. If such a previous search query is found, then the suggested search query 360 is defined by deleting the cursor indicative search term 370 in the received search query 350. In the example of FIG. 6, where the first received search query portion 372 is "PERSIAN", the second received search query portion 372 is "PHOTO" and the cursor indicative search term 370 is "CAT", "PERSIAN PHOTO" is defined as a suggested search query 360 as it is found in the previous search query database 128.

It should also be understood, that once a user selects a particular suggested search query 360, and the selected suggested search query 360 is displayed in the search query interface 256 with the search results interface 258 displaying search results related to that particular search query 360, any subsequent actions by the user to place the cursor 310 in different positions in the search query interface 256 having the selected search query 360 will result in the generation of additional suggested search queries 360 by processing the selected suggested search query 360 using the method 400 described above for processing the search query 350. Thus, in this case, the previously selected suggested search query 360 would be sent to the processor 240 as the search query 350 for the purposes of generating additional suggested search queries 360.

In addition, it should be understood that, in general, the received search query 350 is also processed in other ways in addition to the suggest algorithms described above. The search query 350 received from the user includes a string of alphanumeric and symbolic characters which are processed to distinguish search query words 352 included therein. As will be understood by a skilled worker, the string of characters in the search query 350 is processed using one or more techniques including but not limited to parsing, semantic analysis, contextual analysis, pattern matching and the like. For example, in general, consecutive search query words 352 are separated by a single space but in some instances, search queries 350 entered by the user may include no spaces, or more than two spaces separating consecutive search query words 352. The characters of the search query 350 is processed to distinguish search query words 352 by taking into account the possibility of such discrepancies in the pattern of characters. In this exemplary search query 350 shown in FIGS. 3 to 7, each search query term 352 comprises a single word and thus, the search query 350 also has three search query words. In the description above, the terms "search query term" and "search query word" are used interchangeably but it should be understood that a search query term 352 could be defined differently from a search query word in some situations. For example, a search query term 352 could comprise more than one word. For example, an exemplary search query "NEW YORK TIMES SQUARE PHOTO", includes the search query words "NEW", "YORK", "TIMES", "SQUARE", and "PHOTO" and the search query terms "NEW YORK", "TIMES SQUARE", and "PHOTO". Similarly, a suggested search query term 362 could also include one or more words.

The present technology as described herein allows the user to conduct a search more efficiently, and to obtain the desired results in fewer steps while also providing an improved user experience while the user is performing searches. The improved efficiency in searching as a consequence of the advantages of the present technology enables an overall reduction in the consumption of resources such as bandwidth and energy while the present technology is being used. The present technology can be implemented in devices having lower processing and energy storage capabilities than some of the other presently known web search technologies, thus enabling electronic devices implementing the present technology to be smaller in physical size.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Clause 1. A method (400) of generating search query suggestions for a search query (350) received in a search application (250) from a user, the method (400) being executable by a processor (240) that is communicatively coupled to the search application (250), the method (400) comprising:
  receiving (420) a search query (350), the search query (350) being a received search query (350) and including at least one received search query term (352);
  receiving (430) an indication of a current cursor position with respect to the received search query (350); and
  responsive to the current cursor position being one of a plurality of predefined cursor positions, executing (440) one of a plurality of suggest algorithms corresponding to one of a plurality of predefined suggest actions associated with the current cursor position to define a suggested search query (360),
  each one of the plurality of predefined cursor positions having associated therewith at least one of the plurality of predefined suggest actions, each one of the plurality of predefined suggest actions corresponding to one of the plurality of suggest algorithms.

Clause 2. The method (400) of clause 1, wherein the plurality of predefined suggest actions comprises:
  an inserting suggest action for inserting a suggest word in the received search query (350), the inserting suggest action being associated with an insertion suggest algorithm;
  a deleting suggest action for deleting a cursor indicative search term (370) in the received search query (350), the deleting suggest action being associated with a deletion suggest algorithm; and
  a replacing suggest action for replacing the cursor indicative search term (370) in the received search query (350), the replacing suggest action being associated with a replacement suggest algorithm.

Clause 3. The method (400) of clause 1, wherein the plurality of predefined cursor positions comprises:
  a search query beginning cursor position;
  a search query ending cursor position;
  a search term beginning cursor position;
  a search term ending cursor position; and
  a search term interior cursor position.

Clause 4. The method (400) of clause 3, wherein the plurality of predefined suggest actions comprises:
  an inserting suggest action for inserting a suggest word in the received search query (350), the inserting suggest action being associated with an insertion suggest algorithm;
  a deleting suggest action for deleting a cursor indicative search term (370) of the at least one received search query term (352) in the received search query (350), the deleting suggest action being associated with a deletion suggest algorithm; and
  a replacing suggest action for replacing the cursor indicative search term (370) in the received search query (350), the replacing suggest action being associated with a replacement suggest algorithm, and
  wherein:
  the search query beginning cursor position is associated with the inserting suggest action;
  the search query ending cursor position is associated with the inserting suggest action and the deleting suggest action;
  the search term beginning cursor position is associated with the inserting suggest action;
  the search term ending cursor position is associated with the replacing suggest action and the deleting suggest action; and
  the search term interior cursor position is associated with the replacing suggest action and the deleting suggest action.

Clause 5. The method (400) of clause 4, wherein:
  the insertion suggest algorithm corresponding to the inserting suggest action and the deletion suggest algorithm corresponding to the deleting suggest action are both executed responsive to the current cursor position being the search query ending cursor position.

Clause 6. The method (400) of clause 4 or 5, wherein:
  the replacement suggest algorithm corresponding to the replacing suggest action and the deletion suggest algorithm corresponding to the deleting suggest action are both executed responsive to the current cursor position being the search term ending cursor position.

Clause 7. The method (400) of any one of clauses 4 to 6, wherein:
  the replacement suggest algorithm corresponding to the replacing suggest action and the deletion suggest algorithm corresponding to the deleting suggest action are both executed responsive to the current cursor position being the search term interior cursor position.

Clause 8. The method (400) of any one of clause 4 to 7, wherein executing the insertion suggest algorithm comprises:
  selecting the suggested search query (360) from a plurality of previous search queries, each of the plurality of previous search queries (390) including all of the at least one received search query term (352) of the received search query (350) and at least one search term in addition to each of the at least one received search query term (352).

Clause 9. The method (400) of any one of clause 4 to 8, wherein executing the replacement suggest algorithm comprises:
  defining the cursor indicative search term in the received search query (350), a received search query first portion (372) preceding the cursor indicative search term (370) in the received search query (350), and a received search query second portion (374) following the cursor indicative search term (370) in the received search query (350); and selecting the suggested search query (360) from a plurality of previous search queries (390), each of the plurality of previous search queries (390) including:

the received search query first portion (372);

the received search query second portion (374) occurring after the received search query first portion (372); and at least one search term other than the cursor indicative search term (370) between the received search query first portion (372) and the received search query second portion (374).

Clause 10. The method (400) of any one of clauses 4 to 9, wherein executing the deletion suggest algorithm comprises:

defining the cursor indicative search term (370) in the received search query (350), a received search query first portion (372) preceding the cursor indicative search term (370) in the received search query (350), and a received search query second portion (374) following the cursor indicative search term (370) in the received search query (350); and deleting the cursor indicative search term (370) in the received search query (350) to define the suggested search query (360) responsive to:

at least one of a plurality of previous search queries (390) having the received search query first portion (372) followed immediately by the received search query second portion (374) without the cursor indicative search term (370) appearing between the received search query first portion (372) and the received search query second portion (374).

Clause 11. The method (400) of any one of clauses 1 to 7, wherein the suggested search query (360) is defined using previous search queries (390).

Clause 12. The method (400) of any one of clauses 1 to 11, wherein defining the suggested search query (360) comprises defining a plurality of suggested search queries (360) by executing the one of the plurality of suggest algorithms corresponding to the one of the plurality of predefined suggest actions associated with the current cursor position.

Clause 13. The method (400) of any one of clauses 1 to 12, wherein at least one of the plurality of predefined cursor positions has associated therewith a plurality of the plurality of predefined suggest actions.

Clause 14. The method (400) of clause 13, wherein:

each one of the plurality of suggest algorithms corresponding to each one of the plurality of predefined suggest actions associated with the current cursor position is executed responsive to the current cursor position being one of a plurality of predefined cursor positions.

Clause 15. The method (400) of any one of clauses 1 to 15, wherein:

the one of the plurality of predefined suggest actions associated with the current cursor position is a first suggest action associated with the current cursor position;

the one of the plurality of suggest algorithms is a first suggest algorithm corresponding to the first suggest action;

the suggested search query (360) is a first suggested search query defined using the first suggest algorithm corresponding to the first suggest action; and the current cursor position has associated therewith a second suggest action of the plurality of predefined suggest actions, a second suggest algorithm corresponding to the second suggest action; and the method (400) further comprises:

defining a second suggested search query (360) by executing the second suggest algorithm corresponding to the second suggest action associated with the current cursor position.

Clause 16. The method (400) of any one of clauses 1 to 14, further comprising:

presenting the suggested search query (360) as a user selectable element in a search application window of the search application, the search application window including the received search query (350).

Clause 17. The method (400) of any one of claims 1 to 14, further comprising:

presenting a representation of the suggested search query (360) as a user selectable element in a search application window (252) of the search application (250), the search application window (252) including the received search query (350).

Clause 18. The method of claim 17, wherein the representation of the suggested search query (360) comprises one of:

an entirety of the suggested search query (360);

a portion (362) of the suggested search query (360); and a deletion (366) of a portion (352) of the received search query (350).

Clause 19. The method (400) of clause 2, wherein the plurality of predefined cursor positions comprises:

a search query beginning cursor position;

a search query ending cursor position;

a search term beginning cursor position;

a search term ending cursor position; and a search term interior cursor position.

Clause 20. A server (120) comprising:

a processor (240); and a network communication interface (230) operatively coupled to the processor (240) for communicating, via a communication network (130), with an electronic device (110) executing a search application, the processor (240) being configured to:

receive (420) a search query (350) from the electronic device (110), the search query (350) being a received search query (350) and including at least one received search query term (352);

receive (430), from the electronic device, an indication of a current cursor position with respect to the received search query; and responsive to the current cursor position being one of a plurality of predefined cursor positions, execute (440) one of a plurality of suggest algorithms corresponding to one of a plurality of predefined suggest actions associated with the current cursor position to define a suggested search query (360), each one of the plurality of predefined cursor positions having associated therewith at least one of the plurality of predefined suggest actions, each one of the plurality of predefined suggest actions corresponding to one of the plurality of suggest algorithms.

Clause 21. The server of clause 20, being further configured to:

provide the defined suggested search query (360) to the electronic device (110) for presentation to a user of the electronic device (110).

Clause 22. An electronic device (110) comprising:

a processor (240);

a user output device (220) operatively coupled to the processor (240) and adapted to display a search application window (252);

a user input device (210) operatively coupled to the processor (240) and adapted to allow a user to enter a search query (350) in the search application window (252);

a pointing device (225) operatively coupled to the user output device (220) and the processor (240), the pointing device (225) being adapted to allow the user to position a cursor (310) in the search query (350) in the search application window (252); and a network communication interface (230) operatively coupled to the processor (240) and adapted for communicating with a server (120) via a communication network (130), the processor (240) being configured to:

receive (420) the search query (350), the search query (350) being a received search query (350) and including at least one received search query term (352);

receive (430) an indication of a current cursor position with respect to the received search query;

responsive to the current cursor position being one of a plurality of predefined cursor positions, execute (440) one of a plurality of suggest algorithms corresponding to one of a plurality of predefined suggest actions associated with the current cursor position to define a suggested search query (360), each one of the plurality of predefined cursor positions having associated therewith at least one of the plurality of predefined suggest actions, each one of the plurality of predefined suggest actions corresponding to one of the plurality of suggest algorithms; and present the defined suggested search query (360) in the search application window (252) on the user output device (220).

One skilled in the art will appreciate when the instant description refers to "receiving data" from a user that the electronic device 110 executing receiving of the data from the user may receive an electronic (or other) signal from the user. One skilled in the art will further appreciate that displaying data to the user via a user-graphical interface (such as the screen 220 of the electronic device 110 and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of generating search query suggestions for a search query received from a user in a search application, the method being executable by a processor that is communicatively coupled to the search application, the method comprising:

receiving a search query, the search query being a received search query and including at least one received search query term;

receiving an indication of a current cursor position with respect to the at least one received search query term of the received search query;

responsive to the current cursor position, being one of a plurality of predefined cursor positions, generating at least one suggested search query based on at least one of a plurality of predefined suggest actions, wherein:

each one of the plurality of predefined cursor positions has been associated with at least one of the plurality of predefined suggest actions;

the at least one of the plurality of predefined suggest actions being one of an inserting suggest action and a deleting suggest action;

the one of the plurality of predefined cursor positions is one of a search query beginning cursor position, a search query ending cursor position, a search term beginning cursor position, and a search term ending cursor position; and the at least one of the plurality of predefined suggest actions is for executing of a respective one of a plurality of suggest algorithms to generate the at least one suggested search query, such that:

in response to detection of the current cursor position being one of: the search query beginning cursor position and the search term beginning cursor position, executing the inserting suggest action for executing an insertion suggest algorithm for inserting a term into terms of the search query at the current cursor position;

in response to detection of the current cursor position being the search query ending cursor position, executing at least one of the inserting suggest action and the deleting suggest action, the deleting suggest action for executing a deletion suggest algorithm for deleting a cursor indicative term from the search query;

in response to detection of the current cursor position being the search query term ending cursor position, executing the deleting suggest action;

the at least one suggested search query generated by the at least one of the plurality of suggest actions being different from another suggested search query generated by another one of the plurality of predefined suggest actions.

2. The method of claim 1, wherein executing the insertion suggest algorithm comprises:

selecting the suggested search query from a plurality of previous search queries, each of the plurality of previous search queries including all of the at least one received search query term of the received search query and at least one search term in addition to each of the at least one received search query term.

3. The method of claim 1, wherein the plurality of predefined suggest actions further comprises a replacing suggest action, and wherein:

in response to detection of the current cursor position being the search term interior cursor position, executing at least one of the replacing suggest action and the deleting suggest action, the replacing suggest action is for executing a replacement suggest algorithm for replacing a cursor indicative term in the search query.

4. The method of claim 3, wherein executing the replacement suggest algorithm comprises:

defining the cursor indicative search term in the received search query, a received search query first portion preceding the cursor indicative search term in the received search query, and a received search query second portion following the cursor indicative search term in the received search query; and selecting the suggested search query from a plurality of previous search queries, each of the plurality of previous search queries including:

the received search query first portion;

the received search query second portion occurring after the received search query first portion; and at least one search term other than the cursor indicative search term between the received search query first portion and the received search query second portion.

5. The method of claim 1, wherein executing the deletion suggest algorithm comprises:

defining the cursor indicative search term in the received search query, a received search query first portion preceding the cursor indicative search term in the received search query, and a received search query second portion following the cursor indicative search term in the received search query; and deleting the cursor indicative search term in the received search query to define the suggested search query responsive to:

at least one of a plurality of previous search queries having the received search query first portion followed immediately by the received search query second portion without the cursor indicative search term appearing between the received search query first portion and the received search query second portion.

6. The method of claim 1, wherein the generating the at least one suggested search query comprises generating a plurality of suggested search queries by executing the one of the plurality of suggest algorithms being executed by the respective one of the plurality of predefined suggest actions associated with the current cursor position.

7. The method of claim 1, wherein:

the one of the plurality of predefined suggest actions has been associated with the current cursor position is a first suggest action associated with the current cursor position;

one of the plurality of suggest algorithms is a first suggest algorithm being executed by the first suggest action; the suggested search query is a first suggested search query generated using the first suggest algorithm being executed by the first suggest action; and the current cursor position has been associated with a second suggest action of the plurality of predefined suggest actions, a second suggest algorithm being executed by the second suggest action; and the method further comprises:

generating a second suggested search query by executing, by the second suggest action associated with the current cursor position, the second suggest algorithm.

8. The method of claim 1, further comprising:

presenting the at least one suggested search query as a user selectable element in a search application window of the search application, the search application window including the received search query.

9. The method of claim 1, further comprising:

presenting a representation of the at least one suggested search query as a user selectable element in a search application window of the search application, the search application window including the received search query.

10. The method of claim 9, wherein the representation of the at least one suggested search query comprises one of:

an entirety of the suggested search query;

a portion of the suggested search query; and a deletion of a portion of the received search query.

11. A server comprising:

a processor; and a network communication interface operatively coupled to the processor for communicating, via a communication network, with an electronic device executing a search application, the processor being configured to:

receive an indication of a current cursor position with respect to the at least one received search query term of the received search query;

responsive to the current cursor position, being one of a plurality of predefined cursor positions, generate at least one suggested search query based on at least one of a plurality of predefined suggest actions, wherein:

each one of the plurality of predefined cursor positions has been associated with at least one of the plurality of predefined suggest actions;

the at least one of the plurality of predefined suggest actions being one of an inserting suggest action and a deleting suggest action;

the one of the plurality of predefined cursor positions is one of a search query beginning cursor position, a search query ending cursor position, a search term beginning cursor position, and a search term ending cursor position; and the at least one of the plurality of predefined suggest actions is for executing of a respective one of a plurality of suggest algorithms to generate the at least one suggested search query, such that:

in response to detection of the current cursor position being one of: the search query beginning cursor position and the search term beginning cursor position, executing the inserting suggest action for executing an insertion suggest algorithm for inserting a term into terms of the search query at the current cursor position;

in response to detection of the current cursor position being the search query ending cursor position, executing, at least one of the inserting suggest action and the deleting suggest action, the deleting suggest action for executing a deletion suggest algorithm for deleting a cursor indicative term from the search query;

in response to detection of the current cursor position being the search query term ending cursor position, executing the deleting suggest action;

the at least one suggested search query generated by the at least one of the plurality of suggest actions being different from another suggested search query generated by another one of the plurality of predefined suggest actions.

12. The server of claim 11, being further configured to:

provide the at least one suggested search query to the electronic device for presentation to a user of the electronic device.

13. The server of claim 11, wherein the plurality of predefined suggest actions further comprises a replacing suggest action, and wherein:
- in response to detection of the current cursor position being the search term interior cursor position, executing at least one of the replacing suggest action and the deleting suggest action, the replacing suggest action is for executing a replacement suggest algorithm for replacing a cursor indicative term in the search query.

14. An electronic device comprising:
- a processor;
- a user output device operatively coupled to the processor and adapted to display a search application window;
- a user input device operatively coupled to the processor and adapted to allow a user to enter a search query in the search application window; and
- a pointing device operatively coupled to the user output device and the processor, the pointing device being adapted to allow the user to position a cursor in the search query in the search application window;
- a network communication interface operatively coupled to the processor and adapted for communicating with a server via a communication network,
- the processor being configured to:
- receive a search query, the search query being a received search query and including at least one received search query term;
- receive an indication of a current cursor position with respect to the at least one received search query term of the received search query;
  - responsive to the current cursor position, being one of a plurality of predefined cursor positions, generate at least one suggested search query based on at least one of a plurality of predefined suggest actions, wherein:
    - each one of the plurality of predefined cursor positions has been associated with at least one of the plurality of predefined suggest actions;
    - the at least one of the plurality of predefined suggest actions being one of an inserting suggest action and a deleting suggest action;
    - the one of the plurality of predefined cursor positions is one of a search query beginning cursor position, a search query ending cursor position, a search term beginning cursor position, and a search term ending cursor position; and
    - the at least one of the plurality of predefined suggest actions is for executing a respective one of a plurality of suggest algorithms to generate the at least one suggested search query, such that:
      - in response to detection of the current cursor position being one of: the search query beginning cursor position and the search term beginning cursor position, executing the inserting suggest action for executing an insertion suggest algorithm for inserting a term into terms of the search query at the current cursor position;
      - in response to detection of the current cursor position being the search query ending cursor position, executing, at least one of the inserting suggest action and the deleting suggest action, the deleting suggest action for executing a deletion suggest algorithm for deleting a cursor indicative term from the search query;
      - in response to detection of the current cursor position being the search query term ending cursor position, executing the deleting suggest action;
  - the at least one suggested search query generated by the at least one of the plurality of suggest actions being different from another suggested search query generated by another one of the plurality of predefined suggest actions;
  - present a representation of the generated at least one suggested search query in the search application window on the user output device.

15. The device of claim 14, wherein the plurality of predefined suggest actions further comprises a replacing suggest action, and wherein:
- in response to detection of the current cursor position being the search term interior cursor position, executing at least one of the replacing suggest action and the deleting suggest action, the replacing suggest action is for executing a replacement suggest algorithm for replacing a cursor indicative term in the search query.

* * * * *